(12) United States Patent
Lazar et al.

(10) Patent No.: US 12,552,945 B2
(45) Date of Patent: Feb. 17, 2026

(54) SILICA-BASED HYDROPHOBIC GRANULAR MATERIAL WITH AN INCREASED POLARITY

(71) Applicant: EVONIK OPERATIONS GMBH, Essen (DE)

(72) Inventors: Björn Lazar, Hasselroth (DE); Alexander Lygin, Griesheim (DE); Ulrich Boes, Frankfurt a.M. (DE); Bettina Gerharz-Kalte, Hünfelden (DE); Remi Briand, Leawood, KS (US); Maria Nargiello, Piscataway, NJ (US)

(73) Assignee: Evonik Operations GmbH, Essen (DE)

( * ) Notice: Subject to any disclaimer, the term of this patent is extended or adjusted under 35 U.S.C. 154(b) by 833 days.

(21) Appl. No.: 17/792,400

(22) PCT Filed: Jan. 6, 2021

(86) PCT No.: PCT/EP2021/050105
§ 371 (c)(1),
(2) Date: Jul. 13, 2022

(87) PCT Pub. No.: WO2021/144170
PCT Pub. Date: Jul. 22, 2021

(65) Prior Publication Data
US 2023/0002627 A1    Jan. 5, 2023

(30) Foreign Application Priority Data
Jan. 14, 2020   (EP) ..................... 20151588

(51) Int. Cl.
| C09D 7/62 | (2018.01) |
| C09C 1/28 | (2006.01) |
| C09C 3/00 | (2006.01) |

(52) U.S. Cl.
CPC .............. *C09D 7/62* (2018.01); *C09C 1/28* (2013.01); *C09C 3/006* (2013.01); *C01P 2004/61* (2013.01); *C01P 2006/14* (2013.01)

(58) Field of Classification Search
None
See application file for complete search history.

(56) References Cited

U.S. PATENT DOCUMENTS

| 2,595,262 A | 5/1952 | Hood |
| 3,532,473 A | 10/1970 | Biegler et al. |
| 3,562,177 A | 2/1971 | Teicher et al. |
| 3,574,027 A | 4/1971 | Bonnet |
| 4,048,290 A | 9/1977 | Lee |
| 4,175,159 A | 11/1979 | Raleigh |
| 4,212,925 A | 7/1980 | Kratel et al. |
| 4,247,708 A | 1/1981 | Tsutsumi et al. |
| 4,276,274 A | 6/1981 | Heckel |
| 4,286,990 A | 9/1981 | Kleinschmidt et al. |
| 4,297,143 A | 10/1981 | Kleinschmidt et al. |
| 5,086,031 A | 2/1992 | Deller et al. |
| 5,183,710 A | 2/1993 | Gerbino |
| 5,458,916 A | 10/1995 | Kratel et al. |
| 5,556,689 A | 9/1996 | Kratel et al. |
| 5,565,142 A | 10/1996 | Deshpande et al. |
| 5,685,932 A | 11/1997 | Stohr et al. |
| 5,776,240 A | 7/1998 | Deller et al. |
| 5,851,715 A | 12/1998 | Barthel et al. |
| 6,099,749 A | 8/2000 | Boes et al. |
| 6,268,423 B1 | 7/2001 | Mayer et al. |
| 6,303,256 B1 | 10/2001 | Kerner et al. |
| 6,472,067 B1 | 10/2002 | Hsu et al. |
| 6,479,156 B1 | 11/2002 | Schmidt et al. |
| 7,241,336 B2 | 7/2007 | Scharfe et al. |

(Continued)

FOREIGN PATENT DOCUMENTS

| CA | 2 201 186 | 9/1997 |
| CN | 106316439 | 1/2017 |

(Continued)

OTHER PUBLICATIONS

Non Final Office Action mailed May 11, 2023 for copending U.S. Appl. No. 16/978,164, filed Sep. 3, 2020.
Response to Non Final Office Action filed Jul. 28, 2023 for for copending U.S. Appl. No. 16/978,164, filed Sep. 3, 2020.
U.S. Appl. No. 17/927,040, filed Nov. 22, 2022.
International Search Report for PCT/EP2018/075446 filed Sep. 2020; corresponding to copending U.S. Appl. No. 16/978,164.
Written Opinion of the International Searching Authority for PCT/EP2018/075446 filed Sep. 2020; corresponding to copending U.S. Appl. No. 16/978,164.

(Continued)

*Primary Examiner* — Michael Forrest
(74) *Attorney, Agent, or Firm* — Law Office of Michael A. Sanzo, LLC

(57) ABSTRACT

Silica-based hydrophobic granular material with an increased polarity Silica-based granular material, comprising silica and at least one IR-opacifier, hydrophobized with a surface treatment agent comprising a silicon atom, wherein the granular material has:

a) a cumulative pore volume of pores>4 nm of more than 2.5 cm$^3$/g,
as determined by the mercury intrusion method according to DIN ISO 15901-1;

b) a tamped density of 140 g/L to 290 g/L;

c) a number of silanol groups relative to BET surface area $d_{SiOH}$ of at least 0.5 SiOH/nm$^2$, as determined by reaction with lithium aluminium hydride.

d) a number of silicon atoms in the surface treatment agent relative to BET surface area $d_{[Si]}$ of at least 1.0 [Si atoms]/nm$^2$.

20 Claims, No Drawings

(56) References Cited

U.S. PATENT DOCUMENTS

| | | | |
|---|---|---|---|
| 7,562,534 | B2 | 7/2009 | Jibb et al. |
| 7,674,476 | B1 | 3/2010 | Schwertfeger et al. |
| 7,855,248 | B2 | 12/2010 | Stenzel et al. |
| 8,333,946 | B2 | 12/2012 | Gottschalk et al. |
| 8,389,617 | B2 | 3/2013 | Meyer et al. |
| 8,603,353 | B2 | 12/2013 | Menzel et al. |
| 8,962,519 | B2 | 2/2015 | Heindl et al. |
| 9,233,986 | B2 | 1/2016 | Kratel et al. |
| 9,540,247 | B2 | 1/2017 | Stenzel et al. |
| 9,593,797 | B2 | 3/2017 | Kulprathipanja et al. |
| 9,784,402 | B2 | 10/2017 | Menzel |
| 9,878,911 | B2 | 1/2018 | Maisels et al. |
| 10,005,942 | B2 | 6/2018 | Kim et al. |
| 10,125,234 | B2 | 11/2018 | Hoffman et al. |
| 10,179,751 | B2 | 1/2019 | Geisler et al. |
| 10,618,815 | B2 | 4/2020 | Hindelang et al. |
| 10,618,849 | B2 | 4/2020 | Albinus et al. |
| 10,843,965 | B2 | 11/2020 | Jantke et al. |
| 11,046,850 | B2 | 6/2021 | Bender et al. |
| 2003/0095905 | A1 | 5/2003 | Scharfe et al. |
| 2004/0131527 | A1* | 7/2004 | Gottschalk-Gaudig ............... G03G 9/09725 423/335 |
| 2006/0027227 | A1 | 2/2006 | Everett et al. |
| 2007/0220904 | A1 | 9/2007 | Jibb et al. |
| 2009/0311159 | A1 | 12/2009 | Gray |
| 2010/0146992 | A1 | 6/2010 | Miller |
| 2010/0300132 | A1 | 12/2010 | Schultz |
| 2012/0064345 | A1 | 3/2012 | Gini |
| 2012/0286189 | A1 | 11/2012 | Barthel et al. |
| 2013/0071640 | A1 | 3/2013 | Szillat |
| 2014/0150242 | A1 | 6/2014 | Kratel et al. |
| 2014/0323589 | A1 | 10/2014 | Lazár et al. |
| 2015/0000259 | A1 | 1/2015 | Dietz |
| 2016/0082415 | A1 | 3/2016 | Drexel et al. |
| 2016/0084140 | A1 | 3/2016 | Dietz |
| 2016/0223124 | A1 | 8/2016 | Kulprathipanja et al. |
| 2016/0258153 | A1 | 9/2016 | Koebel et al. |
| 2017/0014792 | A1 | 1/2017 | Bonnardel et al. |
| 2017/0029681 | A1 | 2/2017 | Kim et al. |
| 2017/0233297 | A1 | 8/2017 | Albinus et al. |
| 2017/0268221 | A1 | 9/2017 | Geisler et al. |
| 2018/0001576 | A1 | 1/2018 | Koebel et al. |
| 2018/0065892 | A1 | 3/2018 | Geisler et al. |
| 2019/0276358 | A1 | 9/2019 | Schultz et al. |
| 2019/0382952 | A1 | 12/2019 | Geisler et al. |
| 2020/0031720 | A1 | 1/2020 | Geisler et al. |
| 2020/0062661 | A1 | 2/2020 | Geisler et al. |
| 2020/0124231 | A1 | 4/2020 | Geisler et al. |
| 2021/0039954 | A1 | 2/2021 | Numrich et al. |
| 2021/0269359 | A1 | 9/2021 | Geisler et al. |
| 2021/0292233 | A1 | 9/2021 | Numrich et al. |
| 2021/0292238 | A1 | 9/2021 | Albinus et al. |
| 2023/0062574 | A1 | 3/2023 | Menzel et al. |
| 2023/0110025 | A1 | 4/2023 | Gärtner et al. |

FOREIGN PATENT DOCUMENTS

| | | |
|---|---|---|
| CN | 106830878 | 6/2017 |
| DE | 952891 | 11/1956 |
| DE | 30 37 409 | 5/1982 |
| DE | 199 48 394 | 2/2001 |
| DE | 20 2007 013 074 | 3/2008 |
| DE | 10 2007 020 716 | 11/2008 |
| DE | 10 2007 031 635 | 1/2009 |
| DE | 10 2007 042 000 | 3/2009 |
| DE | 10 2007 051 830 | 5/2009 |
| DE | 10 2008 005 548 | 7/2009 |
| DE | 10 2008 036 430 | 2/2010 |
| DE | 10 2010 040 346 | 3/2012 |
| DE | 10 2013 016 705 | 4/2015 |
| DE | 10 2014 203 091 | 8/2015 |
| EP | 0 032 176 | 7/1981 |
| EP | 0 340 707 | 11/1989 |
| EP | 0 645 576 | 3/1995 |
| EP | 0 647 591 | 4/1995 |
| EP | 0 937 755 | 8/1999 |
| EP | 2 028 329 | 2/2009 |
| EP | 2 204 513 | 7/2010 |
| EP | 2 910 724 | 8/2015 |
| EP | 3 447 038 | 8/2017 |
| EP | 3 403 818 | 11/2018 |
| EP | 3 498 672 | 6/2019 |
| FR | 2873677 | 2/2006 |
| JP | H 10-152360 | 6/1998 |
| KR | 10-2012-0070948 | 7/2021 |
| NO | 2621873 | 4/2018 |
| WO | WO 99/05447 | 2/1999 |
| WO | WO 03/064025 | 8/2003 |
| WO | WO 2005/028195 | 3/2005 |
| WO | WO 2006/097668 | 9/2006 |
| WO | WO 2010/126792 | 11/2010 |
| WO | WO 2011/020671 | 2/2011 |
| WO | WO 2011/066209 | 6/2011 |
| WO | WO 2011/076518 | 6/2011 |
| WO | WO 2011/083174 | 7/2011 |
| WO | WO 2012/041823 | 4/2012 |
| WO | WO 2012/044052 | 4/2012 |
| WO | WO 2013/053951 | 4/2013 |
| WO | WO 2014/090790 | 6/2014 |
| WO | WO 2014/095277 | 6/2014 |
| WO | WO 2015/007450 | 1/2015 |
| WO | WO 2016/045777 | 3/2016 |
| WO | WO 2016/171558 | 10/2016 |
| WO | WO 2017/097768 | 6/2017 |
| WO | WO 2017/102819 | 6/2017 |
| WO | WO 2021/069351 | 4/2021 |
| WO | WO 2021/239475 | 12/2021 |

OTHER PUBLICATIONS

International Preliminary Report on Patentability for PCT/EP2018/075446 filed Sep. 2020; corresponding to copending U.S. Appl. No. 16/978,164.

International Search Report for PCT/EP2019/068361 filed Jul. 9, 2019, corresponding to copending U.S. Appl. No. 17/260,345.

Written Opinion of the International Searching Authority for PCT/EP2019/068361 filed Jul. 9, 2019, corresponding to copending U.S. Appl. No. 17/260,345.

International Preliminary Report on Patentability for PCT/EP2019/068361 filed Jul. 9, 2019, corresponding to copending U.S. Appl. No. 17/260,345.

International Search Report for PCT/EP2021/060255 filed Apr. 20, 2020; corresponding to copending U.S. Appl. No. 17/922,203.

Written Opinion of the International Searching Authority for PCT/EP2021/060255 filed Apr. 20, 2020; corresponding to copending U.S. Appl. No. 17/922,203.

International Preliminary Report on Patentability for PCT/EP2021/060255 filed Apr. 20, 2020; corresponding to copending U.S. Appl. No. 17/922,203.

European Search Report and Search Opinion for U.S. Appl. No. 17/922,203; corresponding to copending U.S. Appl. No. 17/922,203.

Malfait, Wim J., et al., Surface Chemistry of Hydrophobic Silica Aerogels, > *Chemistry of Materials* 27(19):6737-6745 (Oct. 2015).

U.S. Appl. No. 17/802,656, filed Aug. 26, 2022, Gärtner.

U.S. Appl. No. 17/922,203, filed Oct. 28, 2022, Numrich.

International Search Report for corresponding PCT/EP2021/050105 filed Jan. 6, 2021.

Written Opinion of the International Searching Authority for corresponding PCT/EP2021/050105 filed Jan. 6, 2021.

International Preliminary Report on Patentability for PCT/EP2021/050105 filed Jan. 6, 2021.

Partial European Search Report and Search Opinion for corresponding EP 20151588, filed Jan. 14, 2020.

Matthias, et al., "Basic characteristics and applications of aerosol: 30. The chemistry and physics of the aerosol Surface," *Journal of Colloid & Interface Science* 125(1):61-68 (Sep. 1988).

Pajonk, et al., "Physical properties of silica gels and aerogels prepared with new polymeric precursors," *J. Non-Cryst. Solids* 186(2):1-8 (Jun. 1995).

(56) References Cited

OTHER PUBLICATIONS

Schreiner, et al., "Intercomparison of thermal conductivity measurements on an expanded glass granulate in a wide temperature range," *International Journal of thermal Sciences* 95:99-105 (2015).
Somana, Chotangada Gautham, "Evaluation of Aerogel Composite Insulations by Characterization and Experimental Methods," Thesis; B.Eng., R.V. College of Engineering, Banglore, India, (2012).
Ulmann's Encyclopedia of Industrial Chemistry, "Silica" chapter, published online on Apr. 15, 2008, DOI: 10.1002/14356007.a23_583.pub3.
U.S. Appl. No. 16/478,169, filed Jul. 16, 2019, US-2020/0031720 A1, Jan. 30, 2020, Geisler.
U.S. Appl. No. 16/484,368, filed Aug. 7, 2019, US-2019/0382952 A1, Dec. 9, 2019, Geisler.
U.S. Appl. No. 16/605,342, filed Oct. 15, 2019, US-2020/0062661 A1, Feb. 27, 2020, Geisler.
U.S. Appl. No. 16/620,481, filed Dec. 6, 2019, US-2020/0124231 A1, Apr. 23, 2020, Geisler.
U.S. Appl. No. 16/978,164, filed Sep. 3, 2020, US-2021/0039954 A1, Feb. 11, 2021, Numrich.
U.S. Appl. No. 17/260,227, filed Jan. 14, 2021, US-2021/0269359 A1, Sep. 2, 2021, Geisler.
U.S. Appl. No. 17/260,345, filed Jan. 14, 2021, US-2021/0292233 A1, Sep. 23, 2021, Numrich.
U.S. Appl. No. 17/260,371, filed Jan. 14, 2021, US-2021/0292238 A1, Sep. 23, 2021, Albinus.
U.S. Appl. No. 17/792,471, filed Jul. 13, 2022, Menzel.

\* cited by examiner

SILICA-BASED HYDROPHOBIC GRANULAR MATERIAL WITH AN INCREASED POLARITY

CROSS REFERENCE TO RELATED APPLICATIONS

The present application is US national stage of international application PCT/EP2021/050105, which had an international filing date of Jan. 6, 2021 and which was published on Jul. 22, 2021. The PCT application claims priority to EP 20151588.9, filed on Jan. 14, 2020. The content of these prior filings is hereby incorporated by reference in its entirety.

FIELD OF THE INVENTION

The present invention relates to a hydrophobized silica-based granular material, the preparation and the use thereof for thermal and acoustic insulation as well as the corresponding thermal insulating compositions thereof.

BACKGROUND OF THE INVENTION

Effective thermal insulation of houses, industrial plants, pipelines and suchlike is an important economic problem. The majority of insulation materials based on organic substances, such as polyurethane foams, are combustible and only usable at relatively low temperatures. These disadvantages are not exhibited by the hitherto less widespread thermal insulating materials based on inorganic oxides, for example highly porous silicon dioxide.

DESCRIPTION OF THE PRIOR ART

WO 2010126792 A2 discloses compositions with a thermal conductivity of not greater than 50 mW/(mK), comprising a silica aerogel component, a surfactant, either an inorganic or an inorganic binder-containing formulation, e.g. cement, gypsum, lime, acrylate, and optionally other components. Specifically, the high viscous mixture of cement/grout/acrylate/hydrophobic aerogel material with weight ratios of 0.24/0.28/0.15/0.33 can be cured in a mold to give a compound with thermal conductivity of 29.5 mW/(mK).

The use of hydrophobized silica particles as fillers in thermal insulation compositions based on the waterborne formulations is preferred compared to that of hydrophilic silicas. In the latter case, the pores of the silica material would readily be filled with a hydrophilic formulation and cannot impart additional thermal insulating properties to the final composition. The porous structure of the hydrophobized materials, on the contrary, remains intact upon mixing with waterborne formulations.

One technical problem with compositions comprising thermal-insulating silica-based granules is associated with fines. The presence of fines that are the particles with relatively small particle size in a formulation, normally lead to a rapid viscosity increase with increased amount of such particles added to the formulation. In the case if the composition needs to be applied via spray techniques, such fines must be separated beforehand, which means considerable material loss and additional efforts for solid particle handling. It is desirable to avoid the formation of such fines by minimizing attrition of silica-based granules during their incorporation into thermal-insulating compositions. This can be achieved by using more mechanically stable silica-based granules.

WO 2006097668 A1 discloses a granular thermal insulation material comprising hydrophobic fumed silicon dioxide and an opacifier, which is produced by mixing a hydrophobic silicon dioxide with opacifier and subsequent densification to give granules having a size of 0.25 to 2.5 mm. Importantly, it is impossible or at least difficult to densify the hydrophobized silica powder to obtain granules of relatively low density useful for thermal insulation applications. Such granules comprising such hydrophobized silicas are usually not sufficiently mechanically stable or have relatively high tamped density of typically 250 to 450 g/L, which affect negatively their thermal insulation properties.

EP 0725037 A1 describes granules having a median grain diameter of 10 to 120 μm, BET surface area of 40-400 m$^2$/g, cumulative pore volume of >2 nm of 0.5-2.5 mL/g, tamped density of 220-700 g/L based on hydrophobic fumed silica for use as a catalyst support. Granules of this kind are produced by spray-drying of aqueous dispersions containing hydrophilic silica, followed by optional thermal treatment and/or silanization at temperatures of 150 to 1100° C. The examples 3, 4, and 8 show hydrophobized granules thermally treated at 700° C. prior to hydrophobization with a silane. These granules show pore volume of 1.51-1.68 mL/g and tamped density of 300-420 g/L. Though being mechanically stable, such granules possess particular combination of physical properties, such as relatively high tamped density and relatively low pore volume, disadvantageous for using them in thermal insulation applications.

WO 2017036744 A1 describes preparation of hydrophobized silica thermal insulating molding bodies, such as silica granules, by preparation a wet mixture containing silica powder, at least one binder, e.g. a silane, an organic solvent containing at most trace amounts of water, and evaporation of the solvent and granulation of the wet mixture. During the preparation of this wet mixture and/or during the granulation process, hydrophobization of silica takes place. The thus prepared granules are completely hydrophobized, e.g. contain a relatively low amount of free silanol groups on their surface. Moreover, such granules comprising hydrophobized silica can be insufficiently mechanically stable, as no additional densification is applied. This, in turn, reflects in their relatively low skeletal density, as determined by Hg porosimetry.

WO 2018134275 A1 discloses a granular thermal insulation material with an increased mechanical stability, prepared by thermal treatment at 200-1200° C. of a densified mixture of silica and at least one IR-opacifier followed by hydrophobization with a silane. The specific examples of this patent application show preparation of hydrophobized silica-based granules, wherein the hydrophobization step is carried out by treatment of hydrophilic granules with vapour of HMDS. The granules prepared in this way are mechanically stable. However, due to their relatively high hydrophobicity, it may be challenging to incorporate such granules into polar coating systems, e.g. water-based polymer compositions.

Hydrophobic silica powders can be prepared by treatment of the corresponding hydrophilic materials with silanes and optionally water, as described for example in EP 0686676 A1 or DE 102006039273 A1. Such hydrophobic silicas are usually characterized by their high hydrophobicity (high methanol wettability) and consequently, low compatibility with polar solvents. One conceivable way to improve the compatibility of such hydrophobized silica materials with polar systems would be to decrease the amount of silanes used for the hydrophobization. Thus, EP 1433749 A1 describes preparation of partially hydrophobic silicas having a silanol group density of 0.9-1.7 SiOH/nm² particle surface, which can be incorporated into the water-based resins. The preparation of such partially hydrophobic particles is carried out by using a reduced amount of 0.015-0.15 mmol silane pro g of a silica with a BET surface area of 100 m²/g. The resulting silicas have a carbon content of 0.3-1% by weight and a relatively low methanol wettability (methanol number of 0-15). Thus, such silica particles are compatible with polar systems due to the absence of a major part of hydrophobic groups on its surface, but are much less hydrophobic. Considering the teaching of EP 0686676 A1, it seems to be generally impossible to have silica particles having both high hydrophobicity and a good compatibility with polar systems.

EP 3447038 A1 relates to producing silica-based granules for thermal insulation, which are suitable for incorporation in water-based formulations. This good compatibility with water-based systems is achieved in EP 3447038 A1 by at least partial thermal degradation of hydrophobic groups present on the surface of the hydrophobized silica granules by applying a thermal treatment step. This approach, however, inevitably leads to a simultaneous reducing of hydrophobicity. Thus, methanol wettability of such thermally treated granules is significantly lower (20-30%) than that of the corresponding non-treated granules (40-45%). Achieving both high hydrophilicity and high hydrophobicity of the granules seems to be challenging starting from EP 3447038 A1.

Problem and Solution

Thus, good compatibility of highly hydrophobic silica-based materials with typical waterborne coating formulations, such as waterborne acrylate formulations often remains a problem. Thus, silica particles hydrophobized with typical hydrophobic treatment reagents like hexamethyldisilazane (HMDS) either remain separated out from the aqueous acrylate binder system upon mixing or form the cracks in the final cured coating film. Therefore, there is a need for new hydrophobized silica materials, particularly, mechanically stable granules, which would be compatible with waterborne formulations and would allow preparing of compositions with high silica material loading, good thermal insulation properties, high homogeneity before and after curing, and low cost.

The technical problem addressed by the present invention is that of providing a thermal insulating silica-based hydrophobized granular material with an increased mechanical stability, high hydrophobicity and with an increased polarity, and having a particle size distribution suitable for incorporation into polar systems, such as water-based thermal-insulation compositions. Such granular material should provide good thermal-insulating and rheological properties to the thermal-insulating composition it is incorporated into. These granules should also be obtainable in a simple and economically viable way. Another technical problem is to provide such thermal-insulation compositions with pronounced hydrophobic and water-repellent properties, which would efficiently hinder penetration of humidity through the coating layer and impart water and dirt-repelling, protective and anticorrosion properties to the treated surface.

It was found that all technical problems addressed above can efficiently be solved according to the present invention.

The present invention provides silica-based granular material comprising silica and at least one IR-opacifier selected from the group consisting of silicon carbide, titanium dioxide, zirconium dioxide, ilmenites, iron titanates, iron oxides, zirconium silicates, manganese oxides, graphites, carbon blacks and mixtures thereof, hydrophobized with a surface treatment agent comprising a silicon atom, wherein the granular material has:

a) a cumulative pore volume of pores>4 nm of more than 2.5 cm³/g, as determined by the mercury intrusion method according to DIN ISO 15901-1;

b) a tamped density of 140 g/L to 290 g/L;

c) a number of silanol groups relative to BET surface area $d_{SiOH}$ of at least 0.5 SiOH/nm², as determined by reaction with lithium aluminium hydride.

d) a number of silicon atoms in the surface treatment agent relative to BET surface area $d_{[Si]}$ of at least 1.0 [Si atoms]/nm².

The hydrophobized silica-based granular material according to the invention solves the above-mentioned technical problems.

The hydrophobized granular material according to the invention is mechanically stable and does not suffer from any substantial mechanical attrition during its handling and incorporation into liquid compositions. Moreover, such granular material is well compatible with waterborne formulations, which enables one to achieve high loading of such granules, for example in the thermal insulation compositions, providing simultaneously good thermal insulation properties, high homogeneity before and after curing. The insulating compositions with hydrophobized granular material of the invention can contain surprisingly high amounts of fine particles of the hydrophobized granular material and still possess relatively low viscosity. The low viscosity of such compositions does not preclude their easy application, e.g. via spay techniques onto the surfaces to be isolated. Additionally, there is no need to separate the fine particles before their incorporation into the liquid composition. Composition comprising the hydrophobized silica-based granular materials of the invention possess pronounced hydrophobic and water-repellent properties, which efficiently hinder penetration of humidity through the coating layer and impart water and dirt-repelling, protective and anticorrosion properties to such compositions.

The Granular Material

In the present invention, the terms "granular material", "granulate" and "granules" are used as alternatives and are understood to mean a grainy, readily pourable, free-flowing particulate solid material. The granular material of the present invention may be in the form of grainy particles with a spherical or any other shape, like pellets, rings etc, or irregularly-formed fragments of a crushed granular material, e.g. with a statistical particle size distribution. The term "granular material" in the context of the present invention preferably does not encompass powder materials, i.e. fine particles with an average particle size $d_{50}$ of <10 μm.

Cumulative pore volume of pores>4 nm can be determined by the mercury intrusion method according to DIN ISO 15901-1. The principle of this method firstly described by H. L Ritter and L. C Drake in Ind. Eng. Chem. Anal. Ed. 17 (1945) pp. 782-786 and pp 787-791, is based on measurement of the volume of mercury pressed into a porous solid body as a function of the pressure applied. Only the pores into which mercury can penetrate, i.e. generally the pores with a pore diameter of >4 nm, at the maximal pressure applied, e.g. 417 MPa, are detected. Liquid mercury, not wetting the surface of a probe porous solid body, penetrates the pores only under pressure. The pressure to be applied is inversely proportional to the open width of the pore openings, In the case of cylindrical pores, the relationship between pore radius $r_p$ and pressure p is given by the Washburn equation:

$$r_p = -(2 \times \sigma/p) \times \cos \theta$$

wherein:
$r_p$ is pore radius
p is pressure
σ is surface tension of mercury (0.48 N/m)
θ is contact angle of mercury (140° C.)

The cumulative pore volume of pores>4 nm corresponds to the cumulative pore volume of all pores determinable by mercury intrusion method according to DIN ISO 15901-1 up to the determination limit at maximum pressure of 417 MPa.

The cumulative pore volume of pores>4 nm of the silica-based granular material of the present invention determined by mercury intrusion method according to DIN ISO 15901-1 is preferably 2.6 cm$^3$/g-10 cm$^3$/g, more preferably 2.6 cm$^3$/g-9.5 cm$^3$/g, more preferably 2.6 cm$^3$/g-9.0 cm$^3$/g, more preferably 2.6 cm$^3$/g-8.5 cm$^3$/g, more preferably 2.6 cm$^3$/g-8.0 cm$^3$/g, more preferably 3.0 cm$^3$/g-7.5 cm$^3$/g, more preferably 3.5 cm$^3$/g-7.0 cm$^3$/g, more preferably 3.5 cm$^3$/g-6.5 cm$^3$/g, more preferably 4.0 cm$^3$/g-6.0 cm$^3$/g.

The cumulative pore volume of pores<4 μm determined by mercury intrusion method according to DIN ISO 15901-1 corresponds to the cumulative pore volume of all pores<4 μm determinable by this method.

The cumulative pore volume of pores<4 μm of the silica-based granular material of the present invention determined by mercury intrusion method according to DIN ISO 15901-1 is preferably 1.0 cm$^3$/g-7.0 cm$^3$/g, more preferably 1.2 cm$^3$/g-6.5 cm$^3$/g, more preferably 1.4 cm$^3$/g-6.0 cm$^3$/g, more preferably 1.6 cm$^3$/g-5.5 cm$^3$/g, more preferably 1.8 cm$^3$/g-5.0 cm$^3$/g, more preferably 2.0 cm$^3$/g-5.0 cm$^3$/g, more preferably 2.2 cm$^3$/g-4.5 cm$^3$/g, more preferably 2.4 cm$^3$/g-4.2 cm$^3$/g, more preferably 2.5 cm$^3$/g-4.0 cm$^3$/g, more preferably 2.6 cm$^3$/g-3.8 cm$^3$/g.

The percent ratio of a pore volume for pores<4 μm to a cumulative pore volume of pores>4 nm of the inventive granular material, both pore volumes determined by mercury intrusion method according to DIN ISO 15901-1, is preferably greater than 35%, more preferably greater than 40%, more preferably greater than 45%, more preferably 45%-75%, more preferably 45%-70%, more preferably 50%-65%, more preferably 50%-60%. The percent ratio of a pore volume for pores<4 μm to a cumulative pore volume of pores>4 nm can be found by dividing of the former by the latter pore volume and multiplying the result with 100%.

The skeletal density of a sample of a material is a density without taking into consideration the porosity of the material, i.e. the ratio of the mass of the sample divided by the volume of this sample without the volume of all its pores. The skeletal density of the granular material according to the invention can be calculated from the results of the analysis of the sample by mercury intrusion method according to DIN ISO 15901-1 after the volume of all pores larger than 4 nm (at maximal intrusion pressure of 417 MPa) has been excluded from the volume presumed occupied by the material.

The skeletal density of the granular material of the present invention determined by mercury intrusion according to DIN ISO 15901-1 at 417 MPa is preferably at least 0.6 g/cm$^3$, more preferably at least 0.7 g/cm$^3$, more preferably 0.7 g/cm$^3$-4.0 g/cm$^3$, more preferably 0.8 g/cm$^3$-3.0 g/cm$^3$, more preferably 0.9 g/cm$^3$-2.9 g/cm$^3$, more preferably 0.9 g/cm$^3$-2.80 g/cm$^3$, more preferably 1.0 g/cm$^3$-2.7 g/cm$^3$, more preferably 1.1 g/cm$^3$-2.6 g/cm$^3$, more preferably 1.2 g/cm$^3$-2.5 g/cm$^3$, more preferably 1.3 g/cm$^3$-2.4 g/cm$^3$.

A relatively high skeletal density of the granular material according to the present invention leads to its high mechanical stability beneficial e.g. for application of such granules in thermal insulating compositions.

The number $d_{SiOH}$ of silanol groups relative to BET surface area of the silica-based granular material of the present invention, expressed in SiOH-groups/nm$^2$, can be determined by the method described in detail on page 8, line 17 thru page 9, line 12 of EP 0725037 A1 by reaction of the silica-based material with lithium aluminium hydride.

This method is also described in detail in Journal of Colloid and Interface Science, vol. 125, no. 1, (1988), pp. 61-68.

The silanol (SiOH) groups of the silica-based material are reacted with lithium aluminium hydride (LiAlH$_4$), the quantity of gaseous hydrogen formed during this reaction and thus the amount of silanol groups in the sample $n_{OH}$ (in mmol SiOH/g) is determined. Using the corresponding BET surface area (in m$^2$/g) of the tested material, the silanol group content in mmol OH/g can be easily converted in number $d_{SiOH}$ of silanol groups relative to BET surface area:

$$d_{OH} \text{[SiOH/nm}^2\text{]} = (n_{OH} \text{[mmol SiOH/g]} \times N_A)/(\text{BET [m}^2\text{/g]} \times 10^{21}),$$

wherein $N_A$ is Avogadro number (~6.022*10$^{23}$)

The silica-based granular material of the present invention preferably has a hydroxyl group number relative to BET surface area $d_{OH}$ of at least 0.6 SiOH/nm$^2$, more preferably 0.6 SiOH/nm$^2$-2.5 SiOH/nm$^2$, more preferably 0.7 SiOH/nm$^2$-2.0 SiOH/nm$^2$, more preferably 0.7 SiOH/nm$^2$-1.9 SiOH/nm$^2$, more preferably 0.7 SiOH/nm$^2$-1.8 SiOH/nm$^2$, more preferably 0.7 SiOH/nm$^2$-1.7 SiOH/nm$^2$, more preferably 0.8 SiOH/nm$^2$-1.6 SiOH/nm$^2$, more preferably 0.9 SiOH/nm$^2$-1.5 SiOH/nm$^2$.

The silica-based granular material according to the present invention preferably has a silanol group content of greater than 0.03 mmol SiOH/g, more preferably 0.04 mmol SiOH/g-0.50 mmol SiOH/g, more preferably 0.05 mmol SiOH/g-0.45 mmol SiOH/g, more preferably 0.07 mmol SiOH/g-0.40 mmol SiOH/g, more preferably 0.10 mmol SiOH/g-0.40 mmol SiOH/g, more preferably 0.15 mmol SiOH/g-0.35 mmol SiOH/g.

The number of silicon atoms in the surface treatment agent relative to BET surface area of the granular material $d_{[Si]}$ shows the relative to the surface area amount of surface treatment groups present in the granular material of the present invention. Analyzing the values of $d_{SiOH}$ and $d_{[Si]}$ of the granular material of the present invention helps to characterize the extent of both hydrophilic and hydrophobic properties of the inventive granular material and underline its uniqueness comparing to the materials known from the prior art.

The number of silicon atoms in the surface treatment agent relative to BET surface area of the granular material $d_{[Si]}$ is at least 1.0 Si atoms/nm$^2$, preferably 1.2 Si atoms/nm$^2$-10 Si atoms/nm$^2$, more preferably 1.3 Si atoms/nm$^2$-9.0 Si atoms/nm$^2$, more preferably 1.4 Si atoms/nm$^2$-8.0 Si atoms/nm$^2$, more preferably 1.5 Si atoms/nm$^2$-7.0 Si atoms/nm$^2$, more preferably 1.8 Si atoms/nm$^2$-6.0 Si atoms/nm$^2$, more preferably 2.0 Si atoms/nm$^2$-5.0 Si atoms/nm$^2$.

The number of silicon atoms in the surface treatment agent relative to BET surface area of the granular material of the present invention $d_{[Si]}$ [in Si atoms/nm$^2$] can be calculated from the carbon content of the granular material related to the presence of the surface treatment (C*, in wt %), and considering the chemical structure of the surface treatment, e.g. the number of carbon atoms per silicon atom of the surface treatment agent ($N_{C/Si}$):

$$d_{[Si]} \text{ [Si atoms/nm}^2] = (C^*[\text{wt. \%}] \times N_A)/(Mr_C \text{ [g/mol]} \times N_{C/Si} \times \text{BET [m}^2\text{/g]} \times 10^{20}),$$

wherein $Mr_C = 12,011$ g/mol is an atomic weight of carbon, $N_A$ is Avogadro number (~$6.022 \times 10^{23}$).

$N_{C/Si}$ is the ratio of carbon to silicon atoms in the surface treatment agent.

Thus, for chlorotrimethylsilane [(CH$_3$)$_3$SiCl], $N_{C/Si}=3$. For hexamethyldisilazane [HMDS, (CH$_3$)$_3$Si)$_2$NH] $N_{C/Si}=3$. For polymethyldisiloxane [PDMS] $N_{C/Si}=2$.

For a mixture of two different surface treatment agents comprising silicon atoms, the same way of calculation as described above can be used with the difference that the molar average $N_{C/Si}$ value of the applied surface treatment agents is used. Thus, if a 1:1 (50:50 molar %) molar mixture of HMDS and PDMS is used as a surface treatment agent, the $N_{C/Si}$ value of $(2*0.5+3*0.5)=2.5$ should be used for calculation.

The carbon content of the granular material related to the presence of the surface treatment (C*) can be determined directly, e.g. by using solid NMR analysis ($^1$H or $^{13}$C NMR analysis) with an internal standard or calculated from the carbon content determined by elemental analysis by abstraction of the carbon content not related to the presence of the surface treatment, if the latter can be determined. In the simplest and the most common case, all the carbon content of the granular material of the present invention determinable by the elemental analysis method originates from the surface treatment agent.

The granular material according to the invention can have a carbon content of from 0.2% to 15% by weight, preferably from 0.3% to 12% by weight, more preferably from 0.5% to 10% by weight, more preferably from 1.0% to 8% by weight, even more preferably from 1.2% to 5% by weight, still even more preferably from 1.5% to 3.5% by weight. The carbon content can be determined by elemental analysis according to EN ISO3262-20:2000 (Chapter 8). The analysed sample is weighed into a ceramic crucible, provided with combustion additives and heated in an induction furnace under an oxygen flow. The carbon present is oxidized to $CO_2$. The amount of $CO_2$ gas is quantified by infrared detectors. SiC is not burned and therefore does not affect the value of the carbon content. The stated carbon content of the granular material according to the invention thus refers to all carbon-containing components of the granular material except non-combustible compounds such as silicon carbide, if the latter is used e.g. as an IR-opacifier.

The ratio $d_{[Si]}/d_{SiOH}$ of the silica-based granular material according to the present invention is preferably 0.5 to 10, more preferably 0.8 to 7.0, more preferably 1.0 to 5.0, more preferably 1.2 to 4.5, more preferably 1.5 to 4.0, more preferably 1.7 to 3.5, more preferably 1.8 to 3.4, more preferably 1.9 to 3.3, more preferably 2.0 to 3.2, more preferably 2.1 to 3.1, more preferably 2.2 to 3.1

A high ratio of $d_{[Si]}/d_{SiOH}>10$ corresponds to highly hydrophobic particles with a relatively low content of free silanol groups and hence low affinity of the material to polar systems. A low ratio of $d_{[Si]}/d_{SiOH}<1$, by contrast, is characteristic for highly polar materials with a relatively high free silanol group content, and good compatibility with polar systems, but a lower hydrophobicity.

The granular material of the present invention preferably has a $d_{[Si]}/d_{SiOH}$ of 1 to 10 which makes it sufficiently polar to be incorporated into polar systems, such as water-based coating formulations, but still highly hydrophobic to be used as an efficient thermal insulating material. The granular material of the invention is silica-based, i.e. the granular material comprises silica as a major component. Preferably, the granular material comprises at least 30%, more preferably at least 40%, more preferably at least 50%, more preferably 60%-99%, more preferably 70%-98%, more preferably 75%-95% by weight of silica.

Particle size distribution of the granular material may have a substantial impact on the maximal material loading, viscosity, thermal conductivity and other parameters crucial for the successful applicability of such granules in thermal insulating compositions. The optimal particle size distribution may also depend on the particular binders used in such thermal insulating compositions and the required thickness of thermal insulation coating.

The granular material according to the present invention preferably has a numerical median particle size $d_{50}$ of up to 6000 μm, more preferably from 10 μm to 5000 μm, more preferably from 20 μm to 3000 μm, more preferably from 30 μm to 2500 μm, more preferably from 40 am to 2000 μm, more preferably from 50 am to 1500 μm, more preferably from 80 μm to 1000 μm, more preferably from 100 μm to 900 μm, more preferably from 120 μm to 800 μm, even more preferably from 150 μm to 700 μm and most preferably from 200 μm to 500 μm. A numerical median particle size of the granules can be determined according to ISO 13320:2009 by laser diffraction particle size analysis. The resulting measured particle size distribution is used to define the median $d_{50}$, which reflects the particle size not exceeded by 50% of all particles, as the numerical median particle size.

The granular material according to the present invention preferably has a $d_{10}$ value of from 5 μm to 800 μm, more preferably from 10 μm to 500 μm, more preferably from 20 μm to 400 μm, more preferably from 30 μm to 300 μm, more preferably from 40 μm to 200 μm, more preferably from 50 μm to 150 μm. The preferred $d_{50}$ value is from 200 μm to 3000 μm, more preferably from 300 μm to 2000 μm, more preferably from 350 μm to 1500 μm, more preferably from 400 μm to 1000 μm, more preferably from 450 μm to 900 μm, more preferably from 500 μm to 800 μm. The $d_{10}$ and $d_{50}$ values can be determined according to ISO 13320:2009 by laser diffraction particle size analysis. The resulting measured particle size distribution is used to define the values $d_{10}$ and $d_{50}$, which reflects the particle size not exceeded by 10% or 90% of all particles, respectively.

The granular material of the invention preferably has a particle size of not more than 10000 μm, preferably of not more than 7000 μm, more preferably of not more than 5000 μm, more preferably of not more than 4000 μm, more preferably of not more than 3000 μm, more preferably of not more than 2000 μm, more preferably of not more than 1500 μm, more preferably of not more than 1200 μm. The absence of the particles with a particle size of above the specified range can be achieved for example by sieving of the granules through an appropriate sieve.

Preferably at least 5% by weight, more preferably at least 10% by weight, more preferably at least 15% by weight of the granular material of the present invention has particle size of less than 200 μm. In this case, surprisingly, the so-called fines, i.e. the particles with a particle size of less than 200 μm do not interfere with the use of the granules as additives in liquid formulations. Such granules, containing fines, do not lead to any substantial increase of viscosity of the formulations, as it is often the case with similar silica-based granules. Thus, the fines do not have to be separated from the granules prior to the incorporation of such granules into liquid formulations.

Moreover, unexpectedly, the presence of such fines in the granular material lead to high surface hydrophobicity and pronounced water-repelling properties of the thermal insulating composition comprising such granules. The degree of water-repelling can be determined by measuring the water contact angle.

Tamped densities of various pulverulent or coarse-grain granular materials can be determined according to DIN ISO 787-11:1995 "General methods of test for pigments and extenders—Part 11: Determination of tamped volume and apparent density after tamping". This involves measuring the apparent density of a bed after agitation and tamping. The granular material of the invention has a tamped density of 140 g/L to 290 g/L, more preferably of 140 g/L to 270 g/L, more preferably of 150 g/L to 250 g/L, more preferably of 150 g/L to 240 g/L, more preferably of 150 g/L to 230 g/L, more preferably of 160 g/L to 220 g/L.

The granular material of the invention can have a BET surface area of greater than 20 m$^2$/g, preferably of 30 m$^2$/g to 500 m$^2$/g, more preferably of 50 m$^2$/g to 400 m$^2$/g, more preferably of 70 m$^2$/g to 300 m$^2$/g, most preferably of 80 m$^2$/g to 200 m$^2$/g. The specific surface area, also referred to simply as BET surface area, can be determined according to DIN 9277:2014 by nitrogen adsorption in accordance with the Brunauer-Emmett-Teller method.

Loss on drying (LOD) of the inventive granular material is preferably less than 5.0 wt %, more preferably less than 3.0 wt %, more preferably less than 2.0 wt %, more preferably less than 1.0 wt %, more preferably less than 0.8 wt %, more preferably less than 0.5 wt %. Loss on drying can be determined according to ASTM D280-01 (method A).

The thermal conductivity of the hydrophobized granular material of the invention, measured in the form of a bed according to EN 12667:2001 by the method with the guarded hot plate and the heat flow meter instrument, at a mean measurement temperature of 10° C., a contact pressure of 250 Pa under an air atmosphere and at standard pressure (1 atm), is preferably less than 70 mW/(mK), more preferably less than 50 mW/(mK), more preferably from 10 mW/(mK) to 45 mW/(mK), especially preferably from 15 mW/(mK) to 40 mW/(mK) and most preferably from 20 mW/(mK) to 35 mW/(mK).

Silica

The silica may be an individual compound (silicon dioxide), a silica-based mixed oxide, a silica-based doped oxide, or a mixture thereof.

The silica may be selected from fumed silica, precipitated silica, silica aerogel, silica xerogel, perlite, silicate mineral or clay mineral and mixtures thereof.

Silicate minerals are ionic solids, whose anions consist predominantly of silicate anions $SiO_3^{2-}$. Each silicon atom is the centre of a tetrahedron, whose corners are four oxygen atoms covalently bound to silicon. Two adjacent tetrahedral may share a vertex. Apart from Si and O atoms, silicate minerals may contain alkali metals, alkaline earths and other metal cations. One group of silicate minerals is clays, also known as clay minerals, are hydrous aluminium phyllosilicates (sheet silicates), sometimes with variable amounts of iron, magnesium, alkali metals, alkaline earths, and other cations found on or near some planetary surfaces. The examples of clay minerals are halloysite, kaolinite, illite, montmorillonite, vermiculite, talc, sepiolite, palygorskite and pyrophylite.

The granular material according to the invention preferably comprises amorphous silica. Amorphous or non-crystalline silica lacks the long-range order that is characteristic of a crystal silica, such as present e.g. in quartz.

The amorphous silica present in the granular material according to the invention can be selected from fumed silica, precipitated silica, silica aerogel, silica xerogel and mixtures thereof.

The granular material of the present invention preferably comprises 30% to 95% by weight of silica selected from fumed silica, precipitated silica, silica aerogel, silica xerogel, and mixtures thereof.

The silicon dioxide produced by precipitation (precipitated silica) is formed, for example, during the reaction of water glass solutions (water-soluble sodium silicates) with mineral acids.

Aerogels can be formed by supercritical drying of a $SiO_2$ gel produced by a so-called sol-gel process. The starting materials for $SiO_2$ sol synthesis are often silicon alcoholates. The hydrolysis of such precursors and the condensation between the resulting reactive species are the main basic reactions of the sol-gel process. Tetraalkyl orthosilicates such as tetramethyl orthosilicate or tetraethyl orthosilicate are particularly suitable as silicon sources. The alcohol produced during the hydrolysis of tetraalkyl orthosilicates is removed under supercritical conditions (for methanol, temperature>239.4° C.; pressure>80.9 bar), which leads to the formation of highly porous $SiO_2$ aerogels.

By drying under subcritical conditions, materials with almost identical properties to supercritically dried aerogels, usually called xerogels, can be produced. Preparation of such xerogels is described for example in U.S. Pat. No. 5,565,142 A1.

Particularly preferable for the present invention are pyrogenic (fumed) silicas and silica-based pyrogenic mixed oxides. Fumed silicas are prepared by means of flame hydrolysis or flame oxidation. This involves oxidizing or hydrolysing of hydrolysable or oxidizable starting materials, generally in a hydrogen/oxygen flame. Starting materials used for pyrogenic methods include organic and inorganic substances. Silicon tetrachloride is particularly suitable. The hydrophilic silica thus obtained is amorphous. Fumed silicas are generally in aggregated form. "Aggregated" is understood to mean that what are called primary particles, which are formed at first in the genesis, become firmly bonded to one another later in the reaction to form a three-dimensional network. The primary particles are substantially free of pores and have free hydroxyl groups on their surface. Such hydrophilic silicas can, as required, be hydrophobized, for example by treatment with reactive silanes.

It is also known to produce pyrogenic mixed oxides by simultaneously reacting at least two different metal sources in the form of volatile metal compounds, for example chlorides, in a $H_2/O_2$ flame. One example of such an oxide is the $SiO_2/Al_2O_3$ mixed oxide, which is produced by Evonik under the name Aerosil© MOX 170. When producing Aerosil©MOX 170, a mixture of $SiCl_4$ and $AlCl_3$ is directly hydrolyzed in a flame. Corresponding silanes, such as, for example, methyltrichlorosilane, trichlorosilanes, etc., may also be used as a raw material instead of or in addition to the chlorides, as described in DE-A 952 891, DE-A 25 33 925 and DE-A 27 02 896.

All components of thus prepared mixed oxides, for example silica and alumina in the afore mentioned case, are generally distributed homogeneously in the whole mixed oxide material as opposed to the other kinds of materials like mechanical mixtures of several metal oxides, doped metal oxides and suchlike. In the latter case, e.g. for the mixture of several metal oxides, separated domains of the corresponding pure oxides may be present, which determine the properties of such mixtures.

IR-Opacifier

The granular material of the invention comprises at least one IR-opacifier. Such an IR-opacifier can reduce the infrared transmittance of a heat-insulating material and thus minimize the heat transfer due to radiation. The IR-opacifier is selected from the group consisting of silicon carbide, titanium dioxide, zirconium dioxide, ilmenites, iron titanates, iron oxides, zirconium silicates, manganese oxides, graphites, carbon blacks and mixtures thereof. The mean particle size of the IR-opacifier is preferably between 0.1 and 25 µm.

The granular material of the invention can comprise from 1% to 70% by weight, more preferably from 3% to 65% by weight, more preferably from 5% to 60% by weight, more preferably from 10% to 50% by weight, more preferably from 12% to 30% by weight of the IR-opacifier.

Surface Treatment Agent

In the present invention, the term "hydrophobized with a surface treatment agent comprising a silicon atom" relates to a chemical reaction of a material comprising silica with the corresponding surface treatment agent comprising a silicon atom, which by full or partial modification of the silica surface with hydrophobic groups comprising silicon atoms, imparts hydrophobic properties to the material comprising silica.

The terms "hydrophobized" or "hydrophobic" in the context of the present invention relate to the surface-treated particles having a low affinity for polar media such as water. The hydrophilic particles, by contrast, have a high affinity for polar media such as water. The hydrophobicity of the hydrophobic materials can typically be achieved by the application of appropriate nonpolar groups to the silica surface. The extent of the hydrophobicity of a hydrophobic oxide, e.g. silica can be determined via parameters including its methanol wettability, as described in detail, for example, in WO2011/076518 A1, pages 5-6. In pure water, a hydrophobic silica separates completely from the water and floats on the surface thereof without being wetted with the solvent. In pure methanol, by contrast, a hydrophobic silica is distributed throughout the solvent volume; complete wetting takes place. In the measurement of methanol wettability, a maximum methanol content at which there is still no wetting of the silica is determined in a methanol/water test mixture, meaning that 100% of the silica used remains separate from the test mixture after contact with the test mixture, in unwetted form. This methanol content in the methanol/water mixture in % by volume is called methanol wettability. The higher the level of such methanol wettability, the more hydrophobic the silica. The lower the methanol wettability, the lower the hydrophobicity and the higher the hydrophilicity of the material.

The granular material of the present invention preferably has a methanol wettability of methanol content greater than 10% by volume, more preferably of 20% to 90% by volume, more preferably of 30% to 85% by volume, especially preferably of 35% to 80% by volume, most preferably of 40% to 75% by volume in a methanol/water mixture.

The surface treatment agent comprising a silicon atom is preferably selected from the group consisting of organosilanes, silazanes, acyclic polysiloxanes, cyclic polysiloxanes, and mixtures thereof.

One type of preferred organosilanes is an alkyl organosilane of the general formula $$R'_x(RO)_ySi(C_nH_{2n+1}) \quad \text{(Ia) and}$$

$$R'_x(RO)_ySi(C_nH_{2n-1}) \quad \text{(Ib)}$$

wherein
R=alkyl, such as, for example, methyl-, ethyl-, n-propyl-, i-propyl-, butyl-
R'=alkyl or cycloalkyl, such as, for example, methyl, ethyl, n-propyl, i-propyl, butyl, cyclohexyl, octyl, hexadecyl.
n=1-20
x+y=3
x=0-2, and
y=1-3.

Among alkyl organosilanes of formula (Ia) and (Ib), particularly preferred are octyltrimethoxysilane, octyltriethoxysilane, hexadecyltrimethoxysilane, hexadecyltriethoxysilane.

Organosilanes used for surface treatment may contain halogens such as Cl or Br.

Particularly preferred are the halogenated organosilanes of the following types:
organosilanes of the general formula $$X_3Si(C_nH_{2n+1}) \quad \text{(IIa) and}$$

$$X_3Si(C_nH_{2n-1}) \quad \text{(IIb),}$$

wherein X=Cl, Br, n=1-20;
organosilanes of the general formula $$X_2(R')Si(C_nH_{2n+1}) \quad \text{(IIIa) and}$$

$$X_2(R')Si(C_nH_{2n-1}) \quad \text{(IIIb),}$$

wherein X=Cl, Br
R'=alkyl, such as, for example, methyl, ethyl, n-propyl, i-propyl, butyl, cycloalkyl such as cyclohexyl
n=1-20;
organosilanes of the general formula $$X(R')_2Si(C_nH_{2n+1}) \quad \text{(IVa) and}$$

$$X(R')_2Si(C_nH_{2n-1}) \quad \text{(IVb),}$$

wherein X=Cl, Br
R'=alkyl, such as, for example, methyl, ethyl, n-propyl, i-propyl, butyl, cycloalkyl such as cyclohexyl
n=1-20

Among halogenated organosilanes of formula (II)-(IV), particularly preferred are dimethyldichlorosilane and chloro trimethylsilane.

The used organosilanes can also contain other than alkyl or halogen substituents, e.g. fluorine substituents or some functional groups. Preferably used are functionalized organosilanes of the general formula $$(R'')_x(RO)_ySi(CH_2)_mR' \quad \text{(V),}$$

wherein
R''=alkyl, such as methyl, ethyl, propyl, or halogen such as Cl or Br,
R=alkyl, such as methyl, ethyl, propyl,
x+y=3
x=0-2,
y=1-3,
m=1-20,
R'=methyl-, aryl (for example, phenyl or substituted phenyl residues), heteroaryl —$C_4F_9$, $OCF_2$—CHF—$CF_3$, —$C_6F_{13}$, —O—$CF_2$—$CHF_2$, —$NH_2$, —$N_3$, —SCN, —CH=$CH_2$, —NH—$CH_2$—$CH_2$—$NH_2$, —N—($CH_2$—$CH_2$—$NH_2)_2$, —OOC($CH_3$)C=$CH_2$, —$OCH_2$—CH(O) $CH_2$, —NH—CO—N—CO—($CH_2)_5$, —NH—COO—

CH₃, —NH—COO—CH₂—CH₃, —NH—(CH₂)₃Si(OR)₃, —Sc—(CH₂)₃Si(OR)₃, —SH, —NR¹R²R³ (R¹=alkyl, aryl; R²=H, alkyl, aryl; R³=H, alkyl, aryl, benzyl, C₂H₄NR⁴R⁵ with R⁴=H, alkyl and R⁵=H, alkyl).

Among functionalized organosilanes of formula (V), particularly preferred are 3-methacryloxypropyltrimethoxysilane, 3-methacryloxypropyltriethoxysilane, glycidyloxypropyltrimethoxysilane, glycidyloxypropyltriethoxysilane, aminopropyltriethoxysilane.

Silazanes of the general formula R'R₂Si—NH—SiR₂R' (VI), wherein R=alkyl, such as methyl, ethyl, propyl; R'=alkyl, vinyl, are also suitable as a surface treatment agent. The most preferred silazane of formula (VI) is hexamethyldisilazane (HMDS).

Also suitable as surface treatment agents are cyclic polysiloxanes, such as octamethylcyclotetrasiloxane (D4), decamethylcyclopentasiloxane (D5), dodecamethylcyclohexasiloxane (D6), hexamethylcyclotrisiloxane (D6). Most preferably among cyclic polysiloxanes, D4 is used.

Another useful type of surface treatment agents is polysiloxanes or silicone oils of the general formula (VII):

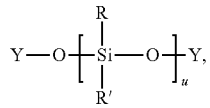

(VII)

wherein
Y=H, CH₃, C$_n$H$_{2n+1}$, wherein n=1-20, Si(CH₃)$_a$X$_b$, wherein a=2-3, b=0 or 1, a +b=3,
X=H, OH, OCH₃, C$_m$H$_{2m+1}$, wherein m=1-20.
R, R'=alkyl, such as C$_o$H$_{2o+1}$, wherein o=1 to 20, aryl, such as phenyl and substituted phenyl residues, heteroaryl, (CH₂)$_k$—NH₂, wherein k=1-10, H,
u=2-1000, preferably u=3-100.

Most preferably among polysiloxanes and silicone oils of the formula (VII), polydimethylsiloxanes are used as surface treatment agents. Such polydimethylsiloxanes usually have a molar mass of 162 g/mol to 7500 g/mol, a density of 0.76 g/mL to 1.07 g/mL and viscosities of 0.6 mPa*s to 1 000 000 mPa*s.

Process for Producing the Granular Material

The present invention further provides a process for producing silica-based granular material according to either of claims 1 to 11, comprising the following steps:

a) dry densifying the powder comprising hydrophilic silica and at least one IR-opacifier selected from the group consisting of silicon carbide, titanium dioxide, zirconium dioxide, ilmenites, iron titanates, iron oxides, zirconium silicates, manganese oxides, graphites, carbon blacks and mixtures thereof to give a hydrophilic granular material with a tamped density of at least 80 g/L;

b) subjecting the hydrophilic granular material produced in step a) to thermal treatment at a temperature of 300° C. to 1400° C.;

c) hydrophobizing the hydrophilic granular material subjected to thermal treatment in step b) in the presence of a surface treatment agent comprising a silicon atom and water, wherein the molar ratio of water to the silicon atoms in the surface treatment agent comprising a silicon atom is from 0.1 to 100, preferably 0.2 to 50, more preferably 0.4 to 20, more preferably 0.5 to 10, more preferably 1 to 5.

The term "dry densifying" in the context of the present invention refers to any process aimed at increasing the density, e.g. a tamped density, of a particulate material, wherein only a small amount or no liquid, such as water, is used during the process. Preferably, not more than 15%, more preferably not more than 12%, more preferably not more than 10%, more preferably not more than 8%, more preferably not more than 5% by weight, of a liquid, such as water, related to the mass of the powder comprising hydrophilic silica, is used in the step a) of the inventive process. Thus, densifying of a silica powder by means of spray drying of an aqueous dispersion of silica powder, such as is disclosed in EP 0725037 A1, does not fall under the term "dry densifying" according to the present invention.

In step a) of the inventive process the powder comprising hydrophilic silica is densified, e.g. by deaeration or compaction, to give a hydrophilic granular material with a tamped density of at least 80 g/L, preferably 80 g/L-400 g/L, more preferably 80 g/L-350 g/L, more preferably 80 g/L-300 g/L, more preferably 80 g/L-250 g/L, more preferably 85 g/L-220 g/L, more preferably 90 g/L-200 g/L.

The main aim of step a) of the process according to the invention is creating hydrophilic granules with a required particle size and tamped density, which are crucial for mechanical and thermal insulating properties of the final hydrophobized granular material prepared by the inventive process.

The inventive process may further comprise another step a-1) preparing a powder mixture comprising hydrophilic silica and at least one IR-opacifier, which is then carried out before step a) of the inventive process. Silica, an IR-opacifier and optionally any other additives, can be mixed together in step a1).

Such mixing of the hydrophilic silica with at least one IR-opacifier and optionally any other additives as per step a1) of the process according to the invention can be conducted with all suitable mixing apparatus known to those skilled in the art. Any mixers or mills that permit good homogenization, such as, for example, blade mixers, ploughshare mixers, fluidized bed mixers, centrifugal mixers or air-swept mixers, are suitable for performing step a1) of the process. Particularly suitable mixers are those with which the material being mixed may additionally be compacted, such as, for example plough bar mixers, pan mills or ball mills. Thus, steps a1) and a) of the process according to the invention can be conducted as individual, separate stages, or alternatively in combination, in one process step.

In step b) of the process according to the invention, thermal treatment of the hydrophilic granular material produced in step a) is conducted at a temperature 300° C. to 1400° C., preferably at 400° C.-1350° C., more preferably at 450° C.-1300° C., more preferably at 550° C.-1280° C., more preferably at 600° C.-1250° C., more preferably at 700° C.-1200° C., more preferably at 750° C.-1200° C., more preferably at 800° C.-1190° C., more preferably at 850° C.-1180° C., more preferably at 900° C.-1150° C. The duration of step b) depends on the applied temperature and is generally from 1 minute to 20 hours, preferably from 5 minutes to 10 hours.

Thermal treatment in step b) of the inventive process leads to reducing the number of free silanol groups, increasing the skeletal density of the silica-based granular material, and significantly increasing the mechanical strength of the hydrophilic granular material.

The hydrophilic granular material produced in step b) of the inventive process preferably has a number of silanol groups relative to BET surface area d$_{SiOH}$ of less than 2.0 SiOH/nm², more preferably 0.3-1.9 SiOH/nm², more preferably 0.4-1.8 SiOH/nm², more preferably 0.5-1.7 SiOH/ nm², more preferably 0.5-1.6 SiOH/nm², more preferably 0.5-1.5 SiOH/nm², more preferably 0.6-1.4 SiOH/nm², more preferably 0.7-1.3 SiOH/nm², as determined by reaction with lithium aluminium hydride.

In the process according to the invention, step a) and/or step b) and/or step c) may be followed by a separation of fractions of the granular material of different size from one another in such a way that only one or more fractions having particular particle sizes are separated off and used further. Such separation can be realized by sieving through an appropriate sieve.

Separation of the particles larger than 4000 μm, more preferably, larger than 3000 μm, more preferably larger than 2000 μm, more preferably larger than 1500 μm, is preferably carried out before conducting step c) of the inventive process. The thus obtained smaller particles can be further used in step c) of the process, whereas the separated large particles can be recycled and further used in the preceding steps of the process, e.g. in step a).

In step c) of the inventive process, hydrophobizing of the hydrophilic granular material subjected to thermal treatment in step b), is carried out in the presence of a surface treatment agent comprising a silicon atom and water, wherein the molar ratio of water to the silicon atoms in the surface treatment agent comprising a silicon atom is from 0.01 to 100, preferably 0.05 to 50, more preferably 0.1 to 40, more preferably 0.1 to 30, more preferably 0.2 to 20, more preferably 0.5 to 15, more preferably 0.8 to 10, more preferably 0.9 to 8, more preferably 1 to 6.

The use of both the surface treatment agent comprising a silicon atom and water in step c) of the inventive process in the above-mentioned proportions is essential for achieving the unique properties of the inventive granular material, i.e. its relatively high hydrophobicity and relatively high polarity.

The surface treatment agent comprising a silicon atom and/or water are preferably used in liquid form in the inventive process.

Step c) of the process according to the invention can be carried out at a temperature of 10° C. to 250° C. for 1 minute to 24 hours. The time and the duration of step c) can be selected according to the specific requirements for the process and/or targeted granulate properties. Thus, the lower treatment temperature usually requires the longer hydrophobization times. In one preferred embodiment of the invention, hydrophobizing of the hydrophilic granular material is performed at 10 to 80° C. for 3 to 24 hours, preferably for 5 to 24 hours. In another preferred embodiment of the invention, step c) of the process is carried out at 90 to 200° C., preferably at 100 to 180° C., most preferably at 120 to 160° C. for 0.5 to 10 hours, preferably for 1 to 8 hours. Step c) of the process according to the invention can be carried out under the pressure of 0.1 to 10 bar, preferably under 0.5 to 8 bar, more preferably at 1 to 7 bar, most preferably under 1.1 to 5 bar. Most preferably, step c) is performed in a closed system under natural vapour pressure of the used surface treatment agent at the reaction temperature.

In step c) of the inventive process, the hydrophilic granular material subjected to thermal treatment in step b) is preferably sprayed first with liquid water and then with a liquid surface treatment agent, or first with a liquid surface treatment agent and then with liquid water, or with a liquid mixture of water and with a liquid surface treatment agent at ambient temperature (about 25° C.) and the mixture is subsequently treated thermally at a temperature of 50° C. to 400° C. over a period of 1 to 6 hours.

An alternative method for surface treatment in step c) can be carried out by treating the hydrophilic granular material subjected to thermal treatment in step b) first with water and then with a surface treatment agent, or first with a surface treatment agent and then with water, or with a mixture of water and with a surface treatment agent, with water and/or a surface treatment agent being in the vapour form and subsequently treating the mixture thermally at a temperature of 50° C. to 800° C. over a period of 0.5 to 6 hours.

The thermal treatment after the hydrophobization in step c) can be conducted under protective gas, such as, for example, nitrogen. The surface treatment can be carried out in heatable mixers and dryers with spraying devices, either continuously or batchwise. Suitable devices can be, for example, ploughshare mixers, freefall mixers or plate, cyclone, or fluidized bed dryers.

The amount of surface treatment agent used can depend on the type of the particles and of the surface treatment agent applied. However, usually from 1% to 15%, preferably 2%-10% by weight of the surface treatment agent related to the amount of the hydrophilic granular material, is employed.

The amount of surface treatment agent used can depend on the type of the particles and of the surface treatment agent applied. However, usually from 1% to 25%, preferably 2%-20%, more preferably 5%-18%, by weight of the surface treatment agent related to the amount of the hydrophilic granular material subjected to thermal treatment in step b), is employed.

The amount of water used can also depend on the type of the particles and of the surface treatment agent applied. However, usually from 0.5% to 15%, preferably 1%-12%, more preferably 2%-10%, by weight of water related to the amount of the hydrophilic granular material subjected to thermal treatment in step b), is employed.

The required amount of water and of the surface treatment agent can depend on the BET surface area of the hydrophilic granular material employed. Thus, preferably, 0.1 μmol-100 μmol, more preferably 1 μmol-50 μmol, more preferably 3.0 μmol-20 μmol of silicon atoms in the surface treatment agent and 0.1 μmol-500 μmol, more preferably 1 μmol-100 μmol, more preferably 10 μmol-50 μmol of water per m² of the BET specific surface area of the hydrophilic granular material subjected to thermal treatment in step b), is employed.

Thermal Insulating Composition

Another subject-matter of the present invention is a thermal insulating composition comprising the hydrophobized granular material of the invention. The thermal insulating composition according to the invention can comprise at least one binder, which joins the individual parts of the cured composition to one another and optionally to one or more fillers and/or other additives and can thus improve the mechanical properties of the cured composition. Such a binder can contain organic or inorganic substances. The binder optionally contains reactive organic substances. Organic binders can, for example, be selected from the group consisting of (meth)acrylates, alkyd resins, epoxy resins, gum Arabic, casein, vegetable oils, polyurethanes, silicone resins, wax, cellulose glue and mixtures thereof. Such organic substances can lead to the curing of the thermal insulating composition used, for example by evaporation of the solvents, polymerization, crosslinking reaction or another type of physical or chemical transformation. Such curing can take place, for example, thermally or under the action of UV radiation or other radiation. Both single (one) component (1-C) and multicomponent systems, particularly two component systems (2-C) can be applied as binder.

Particularly preferred for the present invention are water based or miscible with water (meth)acrylate based binders and epoxy resins (preferably as two-component systems).

The most organic based binder materials like (meth) acrylates and epoxy resins have particular thermal limitations and cannot be used at temperatures above 150° C. In contrast to that, the siloxane based materials (silicone resins) are generally more thermostable and can be applied up to the temperature of about 600° C. without thermal degradation. Such organosiloxane binders (silicone resins) or hybrid systems containing silicone based and other organic ingredients are particularly preferred for the use in the composition of the present invention.

In addition to the organic binder or as an alternative thereto, the thermal insulating composition of the invention can contain inorganic curable substances. Such inorganic binders, also referred to as mineral binders, have essentially the same task as the organic binders, that of joining additive substances to one another. Furthermore, inorganic binders are divided into non-hydraulic binders and hydraulic binders. Non-hydraulic binders are water-soluble binders such as calcium lime, Dolomitic lime, gypsum and anhydrite, which only cure in air. Hydraulic binders are binders which cure in air and in the presence of water and are water-insoluble after the curing. They include hydraulic limes, cements, and masonry cements. The mixtures of different inorganic binders can also be used in the thermal insulating composition of the present invention.

The thermal insulating composition of the invention may comprise 10 to 90% by weight of a hydrophobized granular material and 10 to 90% by weight of the sum of binder and optionally present solvents, preferably water. The weight ratios of the hydrophobized granular material and of the binder/solvents in such a thermal insulating composition may significantly vary depending on the amount of water and/or other solvents present in the thermal insulating composition. Thus, in a ready for application ("wet", "liquid") thermal insulating composition, the ratio of the binder, which may contain water or other solvents, is normally higher. In this case, the thermal insulating composition of the present invention may contain 10% to 60% by weight, more preferably 15% to 50% by weight of the inventive hydrophobized granular material, and 40% to 90% by weight, more preferably 50% to 85% by weight of the sum of the solvents and an inorganic and/or an organic binder. After applying of such a "wet" thermal insulating composition onto the surface to be isolated, the solvents are usually at least partially removed, leaving a "dried", usually solid thermal insulating composition containing 20% to 90% by weight, more preferably 30% to 70% by weight of the hydrophobized granular material of the invention, and 10% to 80% by weight, more preferably 20% to 60% by weight of an inorganic and/or an organic binder.

The curing of the thermal insulating composition can be achieved by at least partial polymerization and/or removal of the solvent. Depending on the system used, this step can preferably take place at a temperature of from 0 to 500° C., particularly preferably from 5 to 400° C., very particularly preferably from 10 to 300° C. The curing can take place in the presence of air or with exclusion of oxygen, for example under a protective-gas atmosphere of nitrogen or carbon dioxide. Said step can take place under standard pressure or under a reduced pressure, for example under vacuum.

Apart from the hydrophobized granular material and the binder, the thermal insulating composition according to the invention can additionally contain at least one solvent and/or filler and/or other additives.

The solvent used in the composition of the invention can be selected from the group consisting of water, alcohols, aliphatic and aromatic hydrocarbons, ethers, esters, aldehydes, ketones and the mixtures thereof. For example, the solvent used can be water, methanol, ethanol, propanol, butanol, pentane, hexane, benzene, toluene, xylene, diethyl ether, methyl tert-butyl ether, ethyl acetate, and acetone. Particularly preferably, the solvents used in the thermal insulating composition have a boiling point of less than 300° C., particularly preferably less than 200° C. Such relatively volatile solvents can be easily evaporated or vaporized during the curing of the thermal insulating composition according to the invention. Most preferably, the thermal insulating composition of the invention contain water as a sole solvent.

In one embodiment of the invention, a mixture of the hydrophobized granular material of the invention, preferably based on fumed silica, and of a hydrophobized silica aerogel granular material is employed in a thermal insulating composition. In such case, the ratio of the hydrophobized granular material of the invention to aerogel material is preferably from 10:1 to 1:1, by weight.

The thermal conductivity of the thermal insulating composition, measured according to EN 12667:2001 by the method with the guarded hot plate and the heat flow meter instrument, at a mean measurement temperature of 10° C., a contact pressure of 250 Pa under an air atmosphere and at standard pressure (1 atm), is preferably less than 70 mW/(mK), more preferably less than 50 mW/(mK), more preferably from 10 mW/(mK) to 45 mW/(mK), especially preferably from 15 mW/(mK) to 40 mW/(mK) and most preferably from 20 mW/(mK) to 35 mW/(mK).

Use of the Granular Material and of the Thermal Insulating Composition

The hydrophobized granular material according to the invention and/or the thermal insulating composition based thereon can in general be used for thermal and/or acoustic insulation, particularly for the acoustic and/or thermal insulating of walls, roofs, houses and thermal insulating of industrial plants, parts of industrial apparatuses, tanks, process pipes, ducts, pipelines and suchlike.

The thermal insulating composition comprising the granular of the invention can be applied on the surface to be isolated by any suitable method, such as brushing, spraying, troweling, immersion coating etc.

EXAMPLES

Analytical Methods. Determination/Calculation of Parameters.

The cumulative pore volume for pores larger than 4 nm (Hg-pore volume>4 nm) [in $cm^3/g$] was determined by the mercury intrusion method according to DIN ISO 15901-1 using AutoPore V 9600 device (Micomeritics). Only the pore volume of pores into which mercury can penetrate, i.e. the pores with a pore diameter of >4 nm, at the maximal pressure applied (417 MPa) was detected.

The cumulative pore volume of pores<4 μm (Hg-pore volume<4 μm, in $cm^3/g$) was determined by the same mercury intrusion method according to DIN ISO 15901-1 and corresponds to the cumulative pore volume of all pores<4 μm determinable by this method.

The skeletal density [in $g/cm^3$] was determined from the results of the analysis of the sample by mercury intrusion method according to DIN ISO 15901-1 after the volume of all pores larger than 4 nm (at the maximal intrusion pressure of 417 MPa) has been excluded from the volume presumed occupied by the material.

Loss on drying (LOD, in wt. %) was determined according to ASTM D280-01 (method A).

Specific BET surface area [m$^2$/g] was determined according to DIN 9277:2014 by nitrogen adsorption in accordance with the Brunauer-Emmett-Teller method.

Tamped density [g/L] was determined according to DIN ISO 787-11:1995.

Methanol wettability [vol % of methanol in methanol/water mixture] was determined according to the method described in detail, in WO2011/076518 A1, pages 5-6.

Carbon content [wt. %] was determined according to EN ISO3262-20:2000 (Chapter 8) by elemental analysis using Carbon Determination System C632 (manufacturer: LECO).

The analysed sample was weighed into a ceramic crucible, provided with combustion additives and heated in an induction furnace under an oxygen flow. The carbon present is oxidized to $CO_2$. The amount of $CO_2$ gas is quantified by infrared detectors (IR). SiC is not burned and therefore does not affect the value of the carbon content.

The number of silanol groups relative to BET surface area $d_{SiOH}$ [in SiOH/nm$^2$] was determined by reaction of the pre-dried samples of granules with lithium aluminium hydride solution as described in detail on page 8, line 17 thru page 9, line 12 of EP 0725037 A1.

The number of silicon atoms in the surface treatment agent relative to BET surface area of the granular material of the present invention $d_{[Si]}$ [in Si atoms/nm$^2$] was calculated from the carbon content related to the presence of the surface treatment (=carbon content determined by elemental analysis for all tested samples), and considering the chemical structure of the surface treatment, e.g. the number of carbon atoms per silicon atom of the surface treatment agent ($N_{C/Si}$):

$$d_{[Si]} \text{ [Si atoms/nm}^2\text{]} = (C^*[\text{wt. \%}] \times N_A)/(Mr_C \text{ [g/mol]} \times N_{C/Si} \times \text{BET [m}^2\text{/g]} \times 10^{20}) \quad (3),$$

wherein $Mr_C$=12,011 g/mol is an atomic weight of carbon, $N_A$ is Avogadro number (~6.022*10$^{23}$).

$N_{C/Si}$ is the ratio of carbon to silicon atoms in the surface treatment agent ($N_{C/Si}$=3 for hexamethyldisilazane).

The $d_{[Si]}/d_{SiOH}$ ratio was calculated by dividing the number of silicon atoms in the surface treatment agent relative to BET surface area ($d_{[Si]}$) by the number of silanol groups relative to BET surface area ($d_{SiOH}$).

Thermal conductivity [in mW/(m*K)] was measured according to EN 12667:2001 by the method with the guarded hot plate and the heat flow meter instrument. The mean measurement temperature was 10° C. and the contact pressure 1000 Pa; the measurement was conducted under air atmosphere at standard pressure.

Preparation of Silica-Based Materials

Comparative Example 1 (Silica Powder Hydrophobized with HMDS)

A silica powder AEROSIL® R812 hydrophobized with HMDS (BET=172 m$^2$/g, manufacturer: EVONIK Resource Efficiency GmbH) was used as a reference material. Physicochemical properties of this silica powder can be found in Table 2.

Comparative Example 2 (Silica/SiC Granules Hydrophobized with HMDS)

Mixing 1000F silicon carbide (Carsimet, manufacturer: Keyvest), 20% by weight, and AEROSIL© R812 hydrophobic silica (hydrophobized with HMDS, BET=172 m$^2$/g, manufacturer: EVONIK Resource Efficiency GmbH), 80% by weight, were mixed by means of a Minox PSM 300 HN/1 MK ploughshare mixer.

Densification

The mixture of AEROSIL© R812 with silicon carbide produced as described above was densified with a Grenzebach densifying roll (Vacupress VP 160/220). The tamped density of the granular material obtained was adjusted via the contact pressure, the roll speed and the reduced pressure applied to 166 g/L. The vacuum applied was less than 300 mbar, absolute. The roll speed was 5 rpm, and the pressure was 2000 N.

Sieving/Fractionation

In order to obtain desired fractions, the granular material was first fed to an oscillating sieve mill with mesh size 3150 μm (manufacturer: FREWITT), in order to establish an upper particle limit and hence remove the particles larger than this upper limit. This was followed by fractionation of the particle fractions, obtaining the particle size of from 200 to 1190 μm. This was done using a vibrating sieve from Sweco, model LS18S. Physicochemical properties of the thus prepared silica-based granular material can be found in Table 2.

Comparative Example 3 (without Thermal Treatment)

Mixing 1000F silicon carbide (Carsimet, manufacturer: Keyvest), 20% by weight, and AEROSIL© 300 hydrophilic silica (BET=300 m$^2$/g, manufacturer: EVONIK Resource Efficiency GmbH), 80% by weight, were mixed by means of a Minox PSM 300 HN/1 MK ploughshare mixer.

Densification

The mixture of AEROSIL© 300 with silicon carbide produced above was densified with a Grenzebach densifying roll (Vacupress VP 160/220). The tamped density of the granular material obtained was adjusted via the contact pressure, the roll speed and the reduced pressure applied to 120±5 g/L. The vacuum applied was less than 300 mbar, absolute. The roll speed was 5 rpm, and the pressure was 2000 N.

Sieving/Fractionation

In order to obtain desired fractions, the granular material was fed to an oscillating sieve mill with mesh size 1000 μm (manufacturer: FREWITT), in order to establish an upper particle limit and hence remove the particles larger than this upper limit.

Hydrophobization

Hydrophilic granules after densification step (100 g) were put in a grounded metal bucket and mixed by a propeller mixer at 200 rpm, and water (8 g) was sprayed at continuous stirring at 25° C. onto their surface, followed by spraying of 12 g of hexamethyldisilazane (HMDS). The mixing was continued for 5 minutes. After this time, the bucket was sealed with a lid containing several holes of 0.5-1 mm diameter for pressure compensation, and stored for 6 hours at 145° C. in an oven. After this time, the granular material was put into a drying pan and dried in the nitrogen atmosphere in an oven at 120° C. for 3 h to evaporate the volatiles.

Physicochemical properties of the thus prepared silica-based granular material can be found in Table 2.

Comparative Example 4 (with Thermal Treatment, without Hydrophobization)

Mixing 1000F silicon carbide (Carsimet, manufacturer: Keyvest), 20% by weight, and AEROSIL© 300 hydrophilic silica (BET=300 m$^2$/g, manufacturer: EVONIK Resource Efficiency GmbH), 80% by weight, were mixed by means of a Minox PSM 300 HN/1 MK ploughshare mixer.

Densification

The mixture of AEROSIL© 300 with silicon carbide produced above was densified with a Grenzebach densifying roll (Vacupress VP 160/220). The tamped density of the granular material obtained was adjusted via the contact pressure, the roll speed and the reduced pressure applied to 120+/−5 g/L. The vacuum applied was less than 300 mbar, absolute. The roll speed was 5 rpm, and the pressure was 2000 N.

Sintering/Hardening

The subsequent thermal hardening was effected in an XR 310 chamber kiln from Schröder Industrieöfen GmbH. For this purpose, multiple layers with a bed of height up to 5 cm were subjected to a temperature programme. The temperature ramp was 300 K/h up to the target temperature of 1025° C.; the hold time was 3 hours; then the sample was cooled (without active cooling) until removal. The tamped density of the obtained sintered granulate was 180+/−10 g/L.

Sieving/Fractionation

In order to obtain desired fractions, the thermally hardened granular material was fed to an oscillating sieve mill with mesh size 1000 μm (manufacturer: FREWITT), in order to establish an upper particle limit and hence remove the particles larger than this upper limit.

Physicochemical properties of the thus prepared silica-based granular material can be found in Table 2.

Comparative Example 5 (with Thermal Treatment, Hydrophobization without Water)

Mixing 1000F silicon carbide (Carsimet, manufacturer: Keyvest), 20% by weight, and AEROSIL© 300 hydrophilic silica (BET=300 m$^2$/g, manufacturer: EVONIK Resource Efficiency GmbH), 80% by weight, were mixed by means of a Minox PSM 300 HN/1 MK ploughshare mixer.

Densification

The mixture of AEROSIL© 300 with silicon carbide produced above was densified with a Grenzebach densifying roll (Vacupress VP 160/220). The tamped density of the granular material obtained was adjusted via the contact pressure, the roll speed and the reduced pressure applied to 120+/−5 g/L. The vacuum applied was less than 300 mbar, absolute. The roll speed was 5 rpm, and the pressure was 2000 N.

Sieving/Fractionation

In order to obtain desired fractions, the thermally hardened granular material was first fed to an oscillating sieve mill with mesh size 1000 μm (manufacturer: FREWITT), in order to establish an upper particle limit and hence remove the particles larger than this upper limit.

Sintering/Hardening

The subsequent thermal hardening was effected in an XR 310 chamber kiln from Schröder Industrieöfen GmbH. For this purpose, multiple layers with a bed of height up to 5 cm were subjected to a temperature programme. The temperature ramp was 300 K/h up to the target temperature of 1025° C.; the hold time was 3 hours; then the sample was cooled (without active cooling) until removal. The tamped density of the obtained sintered granulate was 180+/−10 g/L.

Hydrophobization

Hydrophilic granules after densification step (500 g) were put in a grounded metal bucket and mixed by a propeller mixer at 300-500 rpm and hexamethyldisilazane (HMDS) (60 g) was sprayed at continuous stirring at 25° C. onto their surface. The mixing was continued for 10 minutes. After this time, the bucket was sealed with a lid containing several holes of 0.5-1 mm diameter for pressure compensation, and stored for 6 hours at 145° C. in an oven.

After this time, the granular material was put into a drying pan and dried in the nitrogen atmosphere at 145° C. in an oven for 3 h to evaporate the volatiles.

Fractionation of the particle fractions, if necessary, was done using a vibrating sieve from Sweco, model LS18S.

Physicochemical properties of the thus prepared silica-based granular material can be found in Table 2.

Comparative Example 6 (with Thermal Treatment, Hydrophobization in Vapour Form)

Preparation of hydrophobized silica granules containing IR-opacifier has been conducted similar to PCT/EP2018/051142:

Mixing 1000F silicon carbide (Carsimet, manufacturer: Keyvest), 20% by weight, and AEROSIL© 300 hydrophilic silica (BET=300 m$^2$/g, manufacturer: EVONIK Resource Efficiency GmbH), 80% by weight, were mixed by means of a Minox PSM 300 HN/1 MK ploughshare mixer.

Densification

The mixture of AEROSIL© 300 with silicon carbide produced above was densified with a Grenzebach densifying roll (Vacupress VP 160/220). The tamped density of the granular material obtained was adjusted via the contact pressure, the roll speed and the reduced pressure applied to 121 g/L. The vacuum applied was less than 300 mbar, absolute. The roll speed was 5 rpm, and the pressure was 2000 N.

Sintering/Hardening

The subsequent thermal hardening was effected in an XR 310 chamber kiln from Schröder Industrieöfen GmbH. For this purpose, multiple layers with a bed of height up to 5 cm were subjected to a temperature programme. The temperature ramp was 300 K/h up to the target temperature of 950° C.; the hold time was 3 hours; then the samples were cooled (without active cooling) until removal. The tamped density of the obtained sintered granulate was 180 g/L.

Hydrophobization

The final hydrophobization of the thermally hardened granules was effected at elevated temperatures over the gas phase. For this purpose, hexamethyldisilazane (HMDS, 8.6 wt % relative to the weight of the hydrophilic plate) as hydrophobizing agent was evaporated and conducted through by the reduced pressure process in accordance with the process from Example 1 of WO 2013/013714 A1. The specimens were heated to more than 100° C. in a desiccator and then evacuated. Subsequently, gaseous HMDS was admitted into the desiccator until the pressure had risen to 300 mbar. After the sample had been purged with air, it was removed from the desiccator.

Sieving/Fractionation

In order to obtain desired fractions, the thermally hardened granular material was first fed to an oscillating sieve mill with mesh size 1000 μm (manufacturer: FREWITT), in order to establish an upper particle limit and hence remove the particles larger than this upper limit.

Physicochemical properties of the thus prepared silica-based granular material can be found in Table 2.

Example 1

Granular material according to the invention was prepared similarly to comparative example 5, but for the hydrophobization part, which was conducted as follows: Hydrophilic granules after sintering step (500 g) were put in a grounded metal bucket and mixed by a propeller mixer at 300-500 rpm, and water (40 g) was sprayed at continuous stirring at 25° C. onto their surface followed by spraying of hexamethyldisilazane (HMDS) (60 g). The mixing was continued for 10 minutes. After this time, the bucket was sealed with a lid containing several holes of 0.5-1 mm diameter for pressure compensation, and stored for 6 hours at 145° C. in an oven. After this time, the granular material was put into a drying pan and dried in the nitrogen atmosphere at 145° C. in an oven for 3 h to evaporate the volatiles.

Physicochemical properties of the thus prepared silica-based granular material can be found in Table 2.

Example 2

Granular material according to the invention was prepared similarly to comparative example 5, but for the hydrophobization part, which was conducted as follows: Hydrophilic granules after sintering step (500 g) were put in a grounded metal bucket and mixed by a propeller mixer at 300-500 rpm, and water (40 g) was sprayed at continuous stirring at 25° C. onto their surface followed by spraying of hexamethyldisilazane (HMDS) (37.5 g). The mixing was continued for 10 minutes. After this time, the bucket was sealed with a lid containing several holes of 0.5-1 mm diameter for pressure compensation, and stored for 6 hours at 145° C. in an oven. After this time, the granular material was put into a drying pan and dried in the nitrogen atmosphere at 145° C. in an oven for 3 h to evaporate the volatiles.

Physicochemical properties of the thus prepared silica-based granular material can be found in Table 2.

Example 3

Granular material according to the invention was prepared similarly to comparative example 5, but for the hydrophobization part, which was conducted as follows: Hydrophilic granules after sintering step (500 g) were put in a grounded metal bucket and mixed by a propeller mixer at 300-500 rpm, and water (20 g) was sprayed at continuous stirring at 25° C. onto their surface followed by spraying of hexamethyldisilazane (HMDS) (40.0 g). The mixing was continued for 10 minutes. After this time, the bucket was sealed with a lid containing several holes of 0.5-1 mm diameter for pressure compensation, and stored for 6 hours at 145° C. in an oven. After this time, the granular material was put into a drying pan and dried in the nitrogen atmosphere at 145° C. in an oven for 3 h to evaporate the volatiles.

Physicochemical properties of the thus prepared silica-based granular material can be found in Table 2.

Example 4

Granular material according to the invention was prepared similarly to comparative example 5, but for the hydrophobization part, which was conducted as follows: Hydrophilic granules after sintering step (500 g) were put in a grounded metal bucket and mixed by a propeller mixer at 300-500 rpm, and water (40 g) was sprayed at continuous stirring at 25° C. onto their surface followed by spraying of the mixture containing 60 g of hexamethyldisilazane (HMDS) and 10 g of 3-(trimethoxysilyl)propyl methacrylate (MEMO). The mixing was continued for 10 minutes. After this time, the bucket was sealed with a lid containing several holes of 0.5-1 mm diameter for pressure compensation, and stored for 6 hours at 145° C. in an oven. After this time, the granular material was put into a drying pan and dried in the nitrogen atmosphere at 145° C. in an oven for 3 h to evaporate the volatiles.

Fractionation of the particle fractions, if necessary (see Table 3), was done using a vibrating sieve from Sweco, model LS18S.

Physicochemical properties of the thus prepared silica-based granular material can be found in Table 2.

Example 5

Granular material according to the invention was prepared similarly to comparative example 5, but for the hydrophobization part, which was conducted as follows: Hydrophilic granules after sintering step (500 g) were put in a grounded metal bucket and mixed by a propeller mixer at 300-500 rpm, and water (40 g) was sprayed at continuous stirring at 25° C. onto their surface followed by spraying of the mixture containing 60 g of hexamethyldisilazane (HMDS) and 10 g of 3-(glycidoxypropyl)trimethoxysilane (GLYMO). The mixing was continued for 10 minutes. After this time, the bucket was sealed with a lid containing several holes of 0.5-1 mm diameter for pressure compensation, and stored for 6 hours at 145° C. in an oven. After this time, the granular material was put into a drying pan and dried in the nitrogen atmosphere at 145° C. in an oven for 3 h to evaporate the volatiles.

Fractionation of the particle fractions, if necessary (see Table 3), was done using a vibrating sieve from Sweco, model LS18S.

Physicochemical properties of the thus prepared silica-based granular material can be found in Table 2.

All the granular materials prepared in examples 1-5 showed high porosity, mechanical stability, relatively high values of the skeletal density, relatively high hydrophobicity (high $d_{[Si]}$, methanol wettability values) and relatively high polarity ($d_{[SiOH]}$ value) (Tables 1-2).

These physicochemical properties make such granules well suitable for various applications related to thermal or acoustic insulation. Particularly, for preparing thermal insulation coatings, prepared on the basis of water-based binder systems.

The granular material from comparative example 2 was prepared by densification of the hydrophobized silica powder Aerosil R812 (comparative example 1) with SiC. The value of porosity (Hg pore>4 nm) was significantly reduced (5.22 cm$^3$/g vs. 13.13 cm$^3$/g for granules vs. the powder, respectively) due to the reducing of the interparticle space in the granules compared to the powder. The tamped density and the skeletal density increased due to the densification, whereas the hydrophobicity and the polarity remain unchanged (Tables 1-2).

The granules in comparative example 3 were prepared similarly to those in example 1 with the only difference that no thermal treatment step has been applied. Tamped density, skeletal density and the overall mechanical stability of this sample were significantly lower than those values for the granules prepared in example 1 (Tables 1-2).

The granules from comparative examples 5 and 6 prepared without using water during the hydrophobization step, showed significantly lower $d_{SiOH}$ values than the examples according to the invention, rendering these materials less suitable for incorporation in polar systems, such as water-based thermal insulating coatings.

Preparation of Liquid Thermal Insulation Compositions: General Procedure

The mixing vessel was charged with the required amount of acrylic binder dispersion (styrene acrylic dispersion Acronal S790, manufacturer: BASF, 50 wt. % of total formulation). Under slow agitation with an impellor blade, water (17 wt. % of total formulation) is added, followed by a stepwise addition of the granular material (32 wt. % of total formulation). The mixer speed is increased to maintain a vortex. Ceramic fibres (Lapinus Rockwool) of an average fibre length of 900 μm (approximately 1 wt % of total formulation) were added. All granules were completely dispersed within the dispersion/water medium. Modifiers such as plasticiser, rheology control, coalescent, etc. can be added throughout the mixing steps for optimization.

TABLE 1

Process parameters for preparing silica-based materials.

| Example | Tamped density after densifying, [g/L] | Silanol density $d_{[OH]}$ (after thermal treatment) [SiOH/nm²] | BET before surface treatment, [m²/g] | Thermal treatment, [° C.] | surface treatment agent, (wt % related to granules)* | Si atoms in surface treatment agent/BET [μmol/m²] | Water, [wt % related to granules] | water/BET [μmol/m²] | Water/Si atoms in surface treatment agent [mol/mol] |
|---|---|---|---|---|---|---|---|---|---|
| Comparative example 1 | 60 | 0.46 | 300 | No | HMDS (18) | 7.4 | 0 | 0 | 0 |
| Comparative example 2 | 166 | 0.46 | 300 | No | HMDS (18) | 7.4 | 0 | 0 | 0 |
| Comparative example 3 | 121 | 1.29 | 232 | No | HMDS (12) | 10.1 | 8 | 30.0 | 2.99 |
| Comparative example 4 | 174 | (1.18) | 148 | 1025 | No | 0 | 0 | 0 | — |
| Comparative example 5 | 174 | (1.18) | 148 | 1025 | HMDS (12) | 10.1 | 0 | 0 | 0 |
| Comparative example 6 | 174 | (1.18) | 148 | 950 | HMDS (8.6), in vapour form | 7.2 | 0 | 0 | 0 |
| Example 1 | 174 | (1.18) | 148 | 1025 | HMDS (12) | 10.1 | 8 | 30.0 | 2.99 |
| Example 2 | 174 | (1.18) | 148 | 1025 | HMDS (7.5) | 6.3 | 8 | 30.0 | 4.78 |
| Example 3 | 174 | (1.18) | 148 | 1025 | HMDS (8) | 6.7 | 4 | 15.0 | 2.24 |
| Example 4 | 174 | (1.18) | 148 | 1025 | HMDS (12)/ MEMO (2) | 10.6 | 8 | 30.0 | 2.84 |
| Example 5 | 174 | (1.18) | 148 | 1025 | HMDS (12)/ GLYMO (2) | 10.6 | 8 | 30.0 | 2.83 |

*HMDS = hexamethyldisilazane;
MEMO = 3-(trimethoxysilyl)propylmethacrylate;
GLYMO = (3-glycidoxypropyl)trimethoxysilane

TABLE 2

Physicochemical properties of the silica-based materials

| Material (Example) | Hg-pore volume >4 nm, [cm³/g] | Hg-pore volume <4 μm, [cm³/g] | skeletal density at 417 MPa, [g/cm³] | LOD, [%] | BET, [m²/g] | tamped density, [g/L] | methanol wettability, [%] | $d_{SiOH}$, [SIOH/ nm²] | C-content, [%] | $d_{[Si]}$, [Si/nm²] | $d_{[Si]}/d_{SiOH}$ |
|---|---|---|---|---|---|---|---|---|---|---|---|
| Comparative example 1 | 13.13 | 4.03 | 0.513 | <0.5 | 260 | 60 | 55 | 0.46 | 2.5 | 1.61 | 3.5 |
| Comparative example 2 | 5.22 | 2.36 | 0.797 | <0.4 | 172 | 166 | 50-55 | 0.46 | 2.0 | 1.94 | 4.2 |
| Comparative example 3 | 7.09 | 3.16 | 0.889 | 0.3 | 181 | 135 | 50-55 | 1.29 | 2.3 | 2.12 | 1.6 |
| Comparative example 4 | | 3.30 | | <0.1 | 148 | 174 | 0 | 1.18 | 0 | 0 | 0 |
| Comparative example 5 | 5.21 | 3.04 | 0.996 | 0.1 | 140 | 182 | 45-50 | 0.37 | 1.1 | 1.31 | 3.5 |
| Comparative example 6 | 5.31 | 3.10 | 1.648 | <0.1 | 152 | 191 | 40-45 | 0.16 | 0.9 | 0.99 | 6.2 |
| Example 1 | 5.21 | 2.88 | 1.496 | 0.1 | 117 | 188 | 55-65 | 0.96 | 1.9 | 2.72 | 2.8 |
| Example 2 | 4.62 | 2.61 | 1.965 | 0.1 | 120 | 211 | 60-65 | 1.23 | 2.1 | 2.93 | 2.4 |
| Example 3 | 4.55 | 2.58 | 1.987 | 0.1 | 118 | 192 | 55-60 | 0.91 | 1.6 | 2.27 | 2.5 |

TABLE 2-continued

Physicochemical properties of the silica-based materials

| Material (Example) | Hg-pore volume >4 nm, [cm³/g] | Hg-pore volume <4 µm, [cm³/g] | skeletal density at 417 MPa, [g/cm³] | LOD, [%] | BET, [m²/g] | tamped density, [g/L] | methanol wettability, [%] | $d_{SiOH}$, [SiOH/nm²] | C-content, [%] | $d_{[Si]}$, [Si/nm²] | $d_{[Si]}/d_{SiOH}$ |
|---|---|---|---|---|---|---|---|---|---|---|---|
| Example 4 | 5.33 | 2.92 | 2.000 | 0.6 | 112 | 172 | 50-60 | 1.40 | 2.9 | 3.71 | 2.7 |
| Example 5 | 5.41 | 3.08 | 1.120 | 0.5 | 110 | 190 | 50 | 1.40 | 3.0 | 3.91 | 2.8 |

Similar to the general procedure with styrene acrylic dispersion Acronal S790, the granular material of the invention could successfully be incorporated in the following binder types leading to the corresponding thermal insulating compositions with high (up to 25-30 wt % of total formulation) loading of the granular material:

Vinnapas 224 HD (Wacker, styrene acrylic dispersion copolymerized with vinyl silane);

CE330 Epoxy Binder (two-component, 100% solids epoxy resin, manufacturer:

Cornerstone Construction Material, LLC);

100% solids polyurethane binders;

Stucco water-based formulations with sand being substituted by the granular material.

Preparation of Solid (Dried) Thermal Insulating Compositions

The samples of thermal insulation compositions were applied onto polycarbonate substrates of 20 cm×20 cm×1 cm size, compacted with a spatula to form a wet film of approximately 3-5 cm thickness and were allowed to dry on the air upon the laboratory bench for 24-36 hours at 20° C. and at a humidity of approximately 50% R.H. All thus prepared thermal insulating compositions contained 84.5% by volume of the granular materials in dry film. This volume ratio was calculated as follows: from the amount of granulate $M_{G100}$ in grams in 100 g of dried thermal insulation composition and the known tamped density of the granulate $d_G$ (in g/L), the volume of granulate $V_{G100}$ in 100 g of this composition was calculated:

$$V_{G100} = M_{G100}/d_G$$

From the measured volume $V_{C100}$ of 100 g of the dried thermal insulation composition, the volume ratio of granulate in the dried thermal insulation composition was calculated as follows:

$$r_G(\% \text{ by volume}) = V_{G100}*100\%/V_{C100}.$$

After drying, thermal conductivity measurement of all samples was conducted.

The results of preparation of liquid and dried thermal insulating compositions are summarized in Table 3.

Relatively high dynamic viscosity of composition with granular material from the comparative example 5 did not allow applying this composition via spraying. Conversely, thermal insulation composites with granules from examples 1, 3, 4 and 5 could be applied by spray techniques as well as by brushing. Dried films of between 1 and 2.5 mm thickness could be produced in all these cases.

TABLE 3

Effect of granules on viscosity, ease of application via spraying and thermal conductivity of TIC

| Sample | Particle size, µm (wt % ratio) | Dynamic viscosity of liquid TIC, cP | Application via spraying | Thermal conductivity of dried TIC, mW/mK |
|---|---|---|---|---|
| Comparative example 5 | <1200 (100%) | 350000 | No | Not measured |
| Example 1 | <1000 (100%) | 2032 | Yes | 46.7 |
| Example 3 | <1000 (100%) | 2368 | Yes | 49.5 |
| Example 4 | <1200 (100%) | 2475 | Yes | 65.4 |
| Example 4 | <1200 (75%), <200 (25%) | 4167 | Yes | 61.0 |
| Example 5 | <1200 (100%) | 2500 | Yes | 51.8 |

The invention claimed is:

1. A silica-based granular material, comprising silica and at least one IR-opacifier selected from the group consisting of: silicon carbide, titanium dioxide, zirconium dioxide, ilmenites, iron titanates, iron oxides, zirconium silicates, manganese oxides, graphites, carbon blacks and mixtures thereof; and hydrophobized with a surface treatment agent comprising a silicon atom, wherein the silica-based granular material comprises:
   a) a cumulative pore volume of pores >4 nm of more than 2.5 cm³/g, as determined by a mercury intrusion method according to DIN ISO 15901-1;
   b) a tamped density of 140 g/L to 290 g/L;
   c) a number of silanol groups relative to BET surface area, dsion, of at least 0.5 SiOH/nm², as determined by reaction with lithium aluminium hydride; and
   d) a number of silicon atoms in the surface treatment agent relative to BET surface area, $d_{[si]}$, of at least 1.0 [Si atoms] /nm².

2. The silica-based granular material of claim 1, comprising 30% to 95% by weight of silica selected from the group consisting of: fumed silica, precipitated silica, silica aerogel, silica xerogel, and mixtures thereof.

3. The silica-based granular material of claim 1, comprising 1% to 70% by weight of at least one IR-opacifier selected from the group consisting of: silicon carbide, titanium dioxide, zirconium dioxide, ilmenites, iron titanates, iron oxides, zirconium silicates, manganese oxides, graphites, carbon blacks and mixtures thereof.

4. The silica-based granular material of claim 1, wherein the surface treatment agent comprising a silicon atom is selected from the group consisting of:
   organosilanes, silazanes, acyclic polysiloxanes, cyclic polysiloxanes, and mixtures thereof.

5. The silica-based granular material of claim 1, wherein numerical median particle size d50 of the granular material is from 10 um to 5000 μm.

6. The silica-based granular material of claim 1, wherein at least 5% by weight of the granular material has a particle size of less than 200 μm.

7. The silica-based granular material of claim 1, wherein carbon content of the granular material is from 0.5% to 10% by weight.

8. The silica-based granular material of claim 1, wherein pore volume for pores smaller than 4 μm of the granular material is 2 cm$^3$/g-5 cm$^3$/g, as determined by a mercury intrusion method according to DIN ISO 15901-1.

9. The silica-based granular material of claim 1, comprising a percent ratio of pore volume for pores <4 μm to cumulative pore volume of pores >4 nm of more than 35%, wherein both pore volumes are determined by a mercury intrusion method according to DIN ISO 15901-1.

10. The silica-based granular material of claim 1, wherein skeletal density of the granular material is at least 0.6 g/mL, as determined by a mercury intrusion method according to DIN ISO 15901-1 at 417 Mpa.

11. The silica-based granular material of claim 1, wherein the ratio $d_{[si]}/d_{SiOH}$ is 1 to 10.

12. The silica-based granular material of claim 2, comprising 1% to 70% by weight of at least one IR-opacifier selected from the group consisting of: silicon carbide, titanium dioxide, zirconium dioxide, ilmenites, iron titanates, iron oxides, zirconium silicates, manganese oxides, graphites, carbon blacks and mixtures thereof.

13. The silica-based granular material of claim 12, wherein the surface treatment agent comprising a silicon atom is selected from the group consisting of:
organosilanes, silazanes, acyclic polysiloxanes, cyclic polysiloxanes, and mixtures thereof.

14. The silica-based granular material of claim 13, wherein numerical median particle size d50 of the silica-based granular material is from 10 μm to 5000 μm.

15. The silica-based granular material of claim 13, wherein carbon content of the silica-based granular material is from 0.5% to 10% by weight.

16. The silica-based granular material of claim 13, wherein pore volume for pores smaller than 4 um of the granular material is 2 cm$^3$/g-5 cm$^3$/g, as determined by a mercury intrusion method according to DIN ISO 15901-1.

17. The silica-based granular material of claim 13, wherein the ratio $d_{[si]}/d_{SiOH}$ is 1 to 10.

18. A process for producing the silica-based granular material of claim 16, comprising the following steps:
  a) dry densifying a powder comprising hydrophilic silica and at least one IR-opacifier selected from the group consisting of: silicon carbide, titanium dioxide, zirconium dioxide, ilmenites, iron titanates, iron oxides, zirconium silicates, manganese oxides, graphites, carbon blacks and mixtures thereof to give a hydrophilic granular material with a tamped density of at least 80 g/L;
  b) subjecting the hydrophilic granular material produced of step a) to thermal treatment at a temperature of 300° C. to 1400° C.;
  c) hydrophobizing the hydrophilic granular material subjected to thermal treatment in step b) in the presence of a surface treatment agent comprising a silicon atom and water, wherein the molar ratio of water to the silicon atoms in the surface treatment agent comprising a silicon atom is from 0.1 to 100.

19. A thermal insulating composition comprising the silica-based granular material of claim 1.

20. The thermal insulating composition of claim 19, further comprising a binder selected from the group consisting of: (meth) acrylates, alkyd resins, epoxy resins, gum Arabic, casein, vegetable oils, polyurethanes, silicone resins, hybrid systems containing silicone based and other organic ingredients, wax, cellulose glue, and mixtures thereof.

* * * * *